United States Patent
Plesh et al.

(10) Patent No.: US 8,276,923 B2
(45) Date of Patent: Oct. 2, 2012

(54) MOBILE GIMBALED 5-GALLON BUCKET DOLLY

(75) Inventors: Oleg Michael Plesh, Sun Valley, CA (US); Jeffrey David Atherton, Los Angeles, CA (US)

(73) Assignee: Bucket All, LLC, Los Angeles, CA (US)

( * ) Notice: Subject to any disclaimer, the term of this patent is extended or adjusted under 35 U.S.C. 154(b) by 548 days.

(21) Appl. No.: 12/475,555

(22) Filed: May 31, 2009

(65) Prior Publication Data

US 2010/0225077 A1    Sep. 9, 2010

Related U.S. Application Data

(60) Provisional application No. 61/057,847, filed on May 31, 2008.

(51) Int. Cl.
*B62B 1/16* (2006.01)
(52) U.S. Cl. ................ 280/47.26; 280/47.23; 280/47.34
(58) Field of Classification Search .............. 280/47.23, 280/47.26, 47.34, 47.35; 403/6, 49, 52, 169, 403/175, 187, 234, 292–298, 346, 395, 401
See application file for complete search history.

(56) References Cited

U.S. PATENT DOCUMENTS

| | | | | |
|---|---|---|---|---|
| 337,870 A | * | 3/1886 | Roberts | 414/457 |
| 780,777 A | * | 1/1905 | Colling | 414/457 |
| 1,255,070 A | * | 1/1918 | Waller | 414/450 |
| 1,255,484 A | * | 2/1918 | Stephens | 414/457 |
| 1,468,422 A | * | 9/1923 | Toof | 15/229.7 |
| 2,077,349 A | | 4/1937 | Hobbis | |
| 2,216,202 A | * | 10/1940 | Lake | 43/56 |
| 2,324,747 A | | 7/1943 | Weissert | |
| 2,475,278 A | | 7/1949 | Coakley | |
| 2,654,493 A | * | 10/1953 | Kernkamp | 414/448 |
| 2,683,012 A | * | 7/1954 | Reinsma | 248/129 |
| 2,717,785 A | * | 9/1955 | Ray | 280/646 |
| 2,770,466 A | * | 11/1956 | Pearson et al. | 280/646 |
| 2,835,501 A | | 5/1958 | Chamberlin | |
| 3,016,272 A | * | 1/1962 | Bean | 403/303 |

(Continued)

FOREIGN PATENT DOCUMENTS

WO    WO 2008/109897 A1    9/2008

OTHER PUBLICATIONS 1 page Printout from EBAY on or about Jul. 2010 for item entitled: Butler Steel Hand Cart.

(Continued)

*Primary Examiner* — Joseph Rocca
*Assistant Examiner* — Timothy Wilhelm
(74) *Attorney, Agent, or Firm* — Law Office of David Hong

(57) ABSTRACT

A single handled two-wheeled gimbaled bucket dolly or hand truck is configured to lift, transport and pour the contents of a bucket or container with minimal operator effort. The dolly or hand truck may use a horizontal "C" shaped frame cross member and two rigid vertical gimbaled columns to support a pivoting bucket or container. This apparatus allows the bucket to tilt a full 180 degrees on its horizontal axis in order to effortlessly dispense its contents and to transport the bucket across uneven terrain. A second gimbaled bucket or container holder can be combined into one unit allowing for lifting, transporting and pouring the contents of containers or buckets.

8 Claims, 35 Drawing Sheets

U.S. PATENT DOCUMENTS

| | | | | |
|---|---|---|---|---|
| 3,440,677 | A | * | 4/1969 | Flomerfelt .................. 15/144.1 |
| 3,479,047 | A | * | 11/1969 | Bailey ........................ 280/47.19 |
| 3,612,482 | A | | 10/1971 | Eck |
| 3,871,725 | A | | 3/1975 | Vilen |
| 3,875,981 | A | * | 4/1975 | Brenner et al. ................. 141/98 |
| 3,891,106 | A | * | 6/1975 | Alcanzare .................... 414/425 |
| 3,926,452 | A | | 12/1975 | Goines |
| 4,261,596 | A | | 4/1981 | Douglas |
| 4,274,649 | A | * | 6/1981 | Vanderhorst et al. ......... 280/204 |
| 4,313,701 | A | * | 2/1982 | Brust ............................. 410/52 |
| 4,319,761 | A | * | 3/1982 | Wells ........................ 280/47.36 |
| 4,353,596 | A | | 10/1982 | Gibson |
| 4,453,876 | A | | 6/1984 | Arpin |
| 4,511,154 | A | | 4/1985 | Daloisio |
| 4,576,237 | A | | 3/1986 | Arney |
| 4,861,110 | A | | 8/1989 | Rumpke |
| 4,915,535 | A | * | 4/1990 | Willetts ........................ 403/191 |
| 5,149,116 | A | | 9/1992 | Donze |
| 5,183,280 | A | | 2/1993 | Gresch |
| 5,366,189 | A | | 11/1994 | Thompson |
| 5,464,102 | A | | 11/1995 | LeBlanc |
| 5,469,944 | A | | 11/1995 | Wang |
| D366,748 | S | * | 1/1996 | Harrington .................... D34/24 |
| 5,568,848 | A | | 10/1996 | Liang |
| 5,713,583 | A | * | 2/1998 | Hansen ..................... 280/47.19 |
| 5,845,951 | A | | 12/1998 | Webb |
| 5,938,396 | A | * | 8/1999 | Audet .......................... 414/490 |
| 6,041,945 | A | | 3/2000 | Faraj |
| 6,056,177 | A | | 5/2000 | Schneider |
| 6,158,762 | A | | 12/2000 | Wong |
| 6,349,955 | B1 | * | 2/2002 | Cottard et al. ................ 280/204 |
| 6,490,880 | B1 | * | 12/2002 | Walsh .......................... 62/457.9 |
| 6,505,843 | B1 | * | 1/2003 | Williams .................. 280/47.26 |
| 6,565,279 | B1 | * | 5/2003 | Skovronski et al. .......... 403/192 |
| 7,150,465 | B2 | * | 12/2006 | Darling, III .................. 280/640 |
| 7,290,776 | B2 | * | 11/2007 | Pascznk .................. 280/47.371 |
| 7,878,514 | B1 | * | 2/2011 | Hopkins et al. ............ 280/47.26 |
| 7,891,478 | B2 | * | 2/2011 | Gunst et al. ................... 194/350 |
| 7,905,502 | B2 | * | 3/2011 | Oliver ........................ 280/47.18 |
| 2009/0212535 | A1 | * | 8/2009 | Darling, III .................. 280/651 |

OTHER PUBLICATIONS

U.S. Appl. No. 61/057,847, filed May 31, 2008.
U.S. Appl. No. 12/475,555, filed May 31, 2009.
U.S. Appl. No. 29/360,647, filed Apr. 29, 2010.
U.S. Appl. No. 61/343,588, filed May 1, 2010.
PCT Patent Appl. No. PCT/US2010/036790, filed May 31, 2010.
Photo (1) taken of a carrying apparatus at the (May 19-23, 2009) Chelsea Flower Show, England (1 page).
Printouts (2 pages) from Internet website (http://www.solutions.com/jump.jsp?itemID=9611&itemType=PRODUCT) for Pot Mover Caddy; printed out on Oct. 5, 2009.
3 photos of a rolling cart taken in Holland on or about Summer 2010; this cart appears to be similar to the cart shown in US.
3 photos of a rolling cart taken in Holland on or about Summer 2010; this cart appears to be similar to the cart shown in US 780777 (Colling).
Photos (3) taken of a carrying apparatus in Virginia City, Nevada, U.S. on or about Sep. 2009 (3 pages).
Printouts from Internet website (www.homedepot.com) for ATB 2, 5 Gal. Black Bucket All Terrain Bucket System with Lids and Tool Caddy (7 pages) on or about Jun. 2009.
Printouts from Internet website (www.lowes.com) for "dolly" (2 pages) on or about Oct. 1, 2009.
Printouts from Internet website (www.milwaukeehandtrucks.com)(28 pages) on or about Oct. 1, 2009.
B Gover Limited—English Water Trolley, 1 page, Feb. 21, 2011 printout from Internet website (http://bgoverlimited.1stdibs.com/store/furniture_item_detail.php?id=490295&cur_tab=).

* cited by examiner

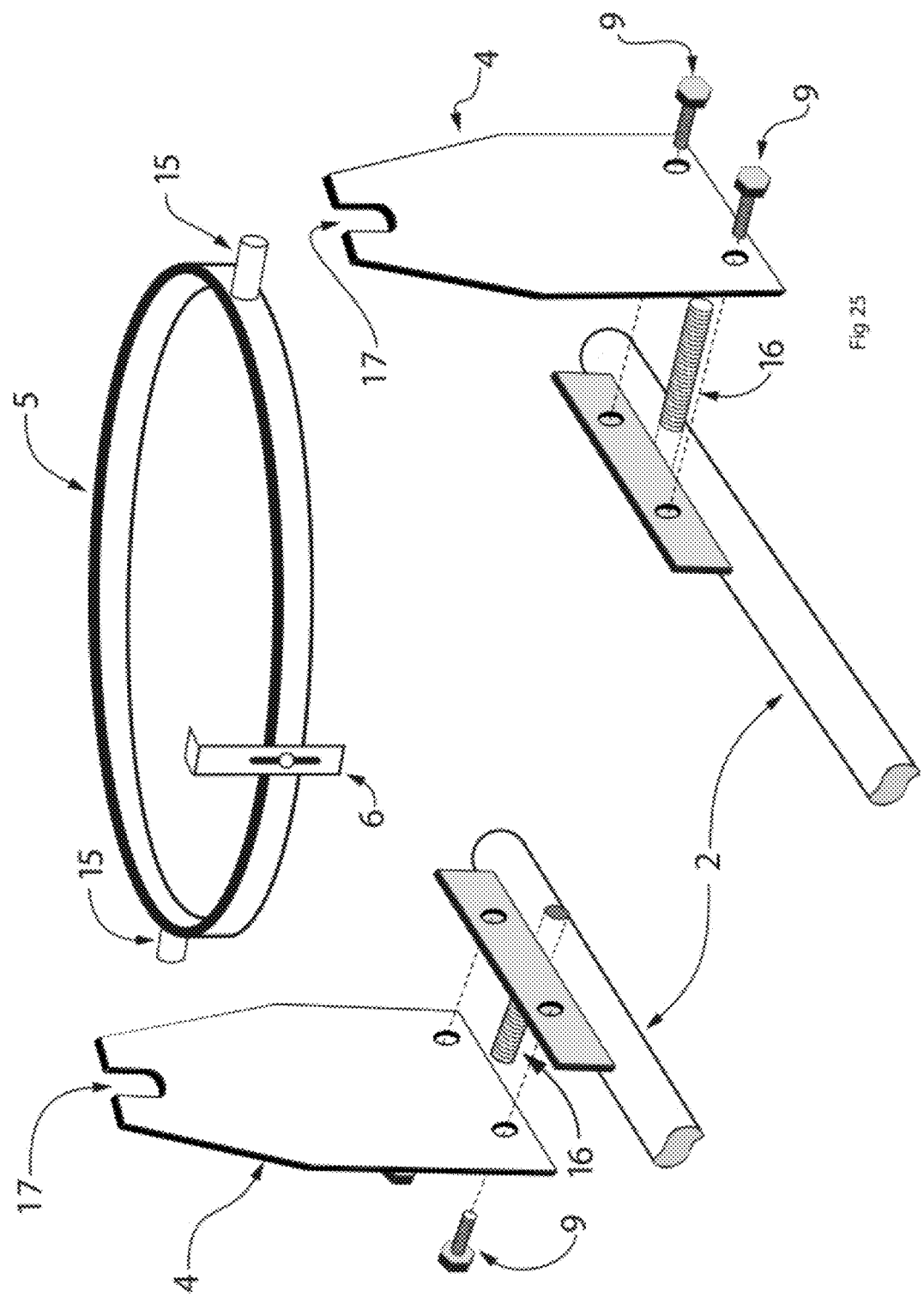

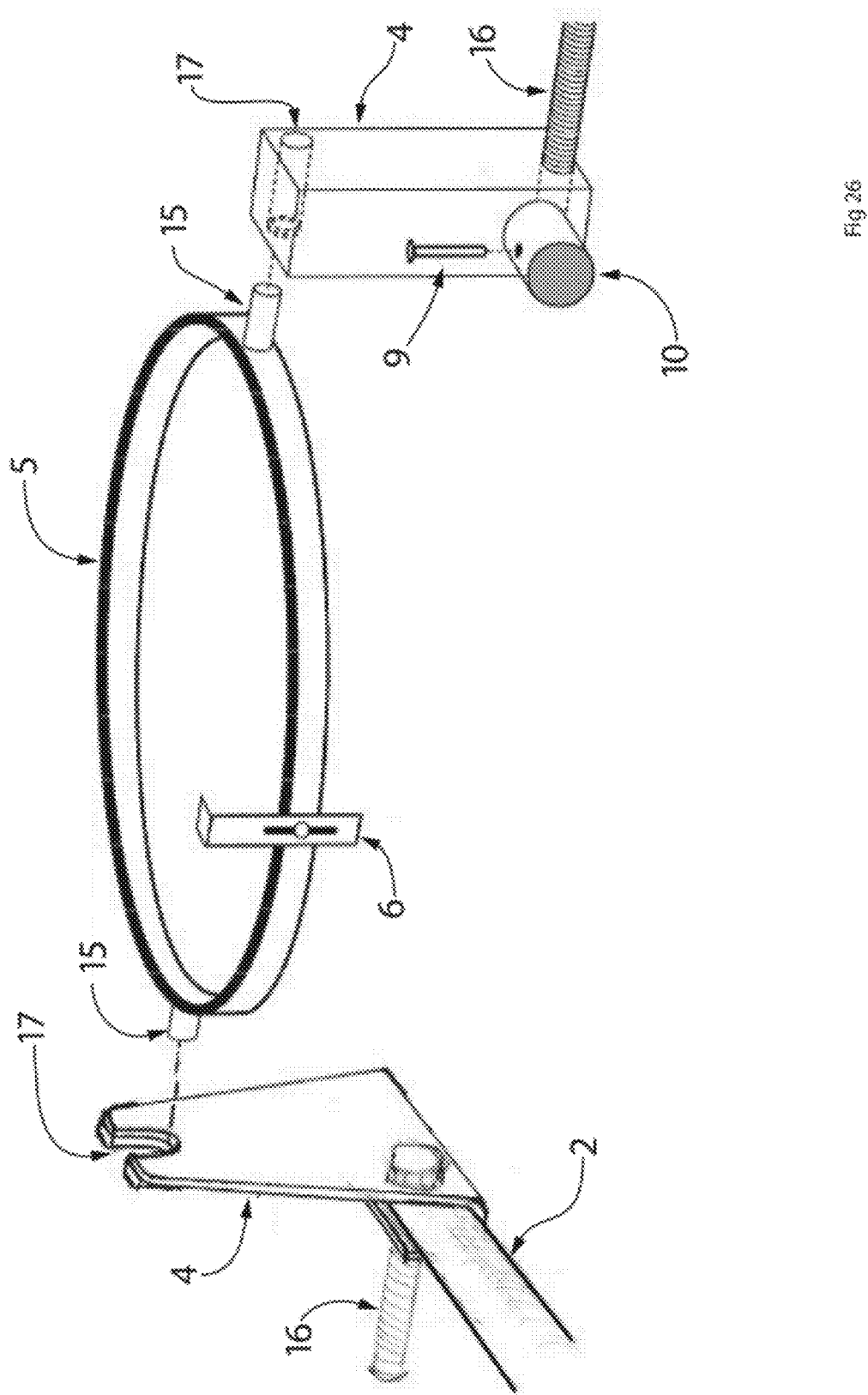

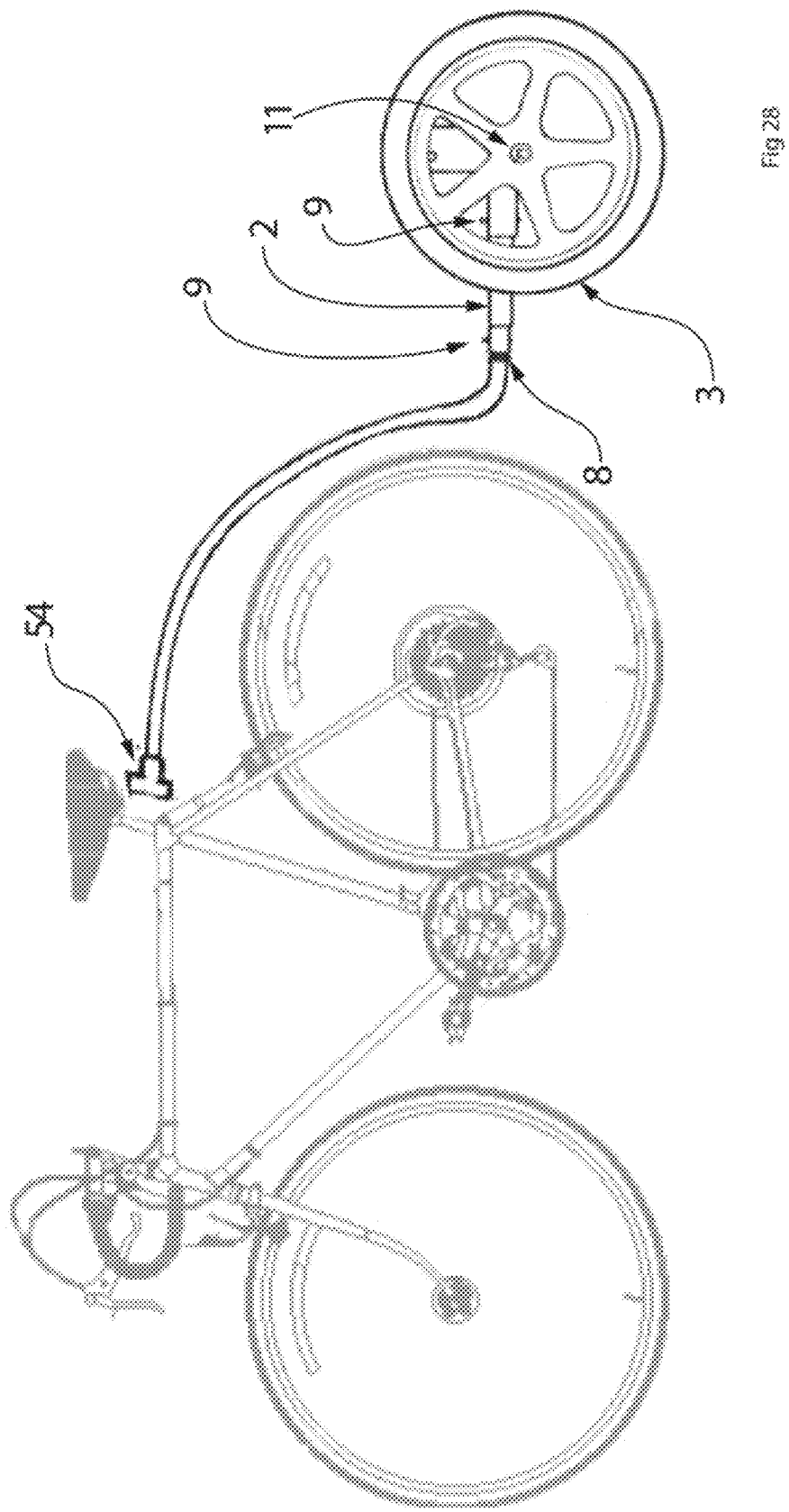

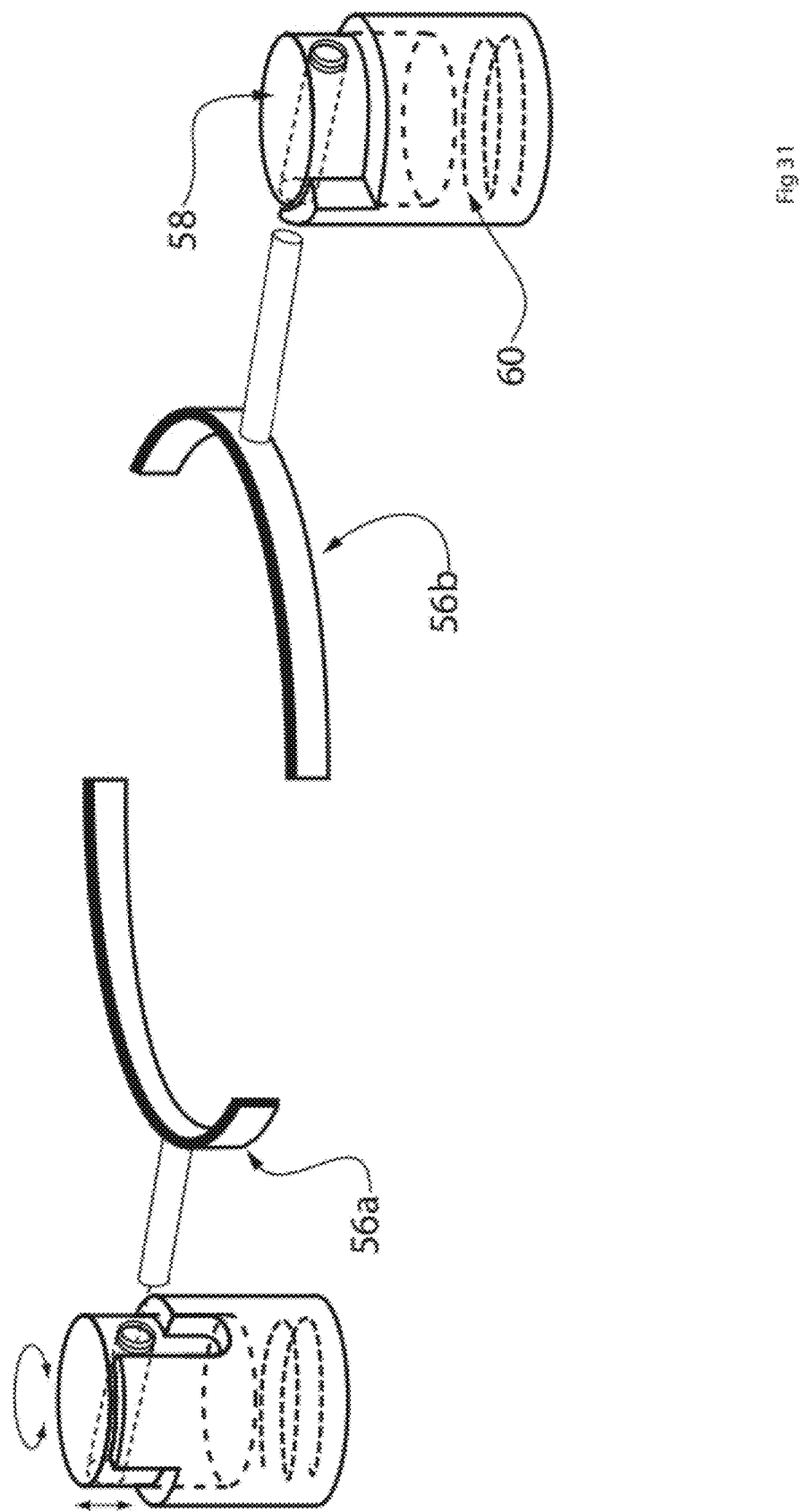

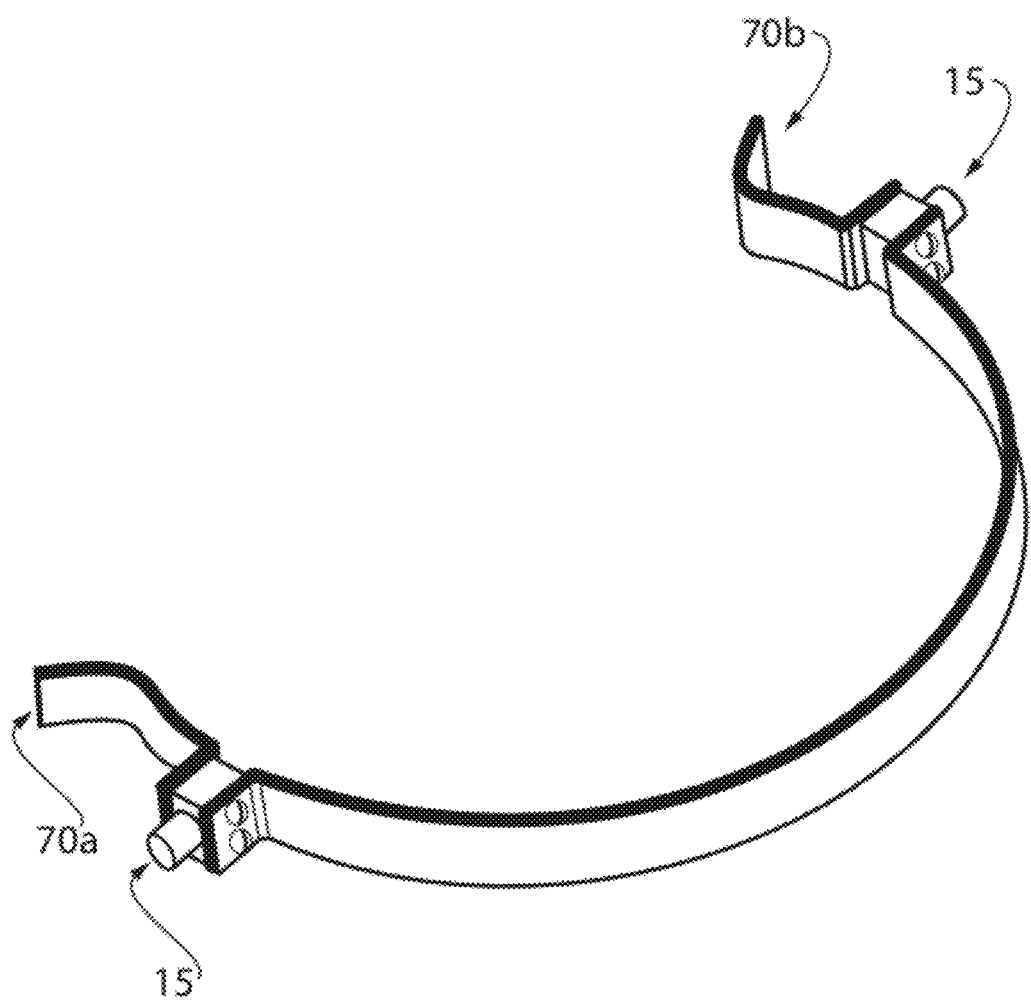

US 8,276,923 B2

MOBILE GIMBALED 5-GALLON BUCKET DOLLY

This application claims the benefit of U.S. Provisional Patent Appl. No. 61/057,847, filed on May 31, 2008.

BACKGROUND OF THE INVENTION

1. Field of the Invention

The field of the present invention relates to a transportation dolly or hand truck for a container.

2. Description of the Prior Art

Conventional dolly or hand truck designs have a number of disadvantages or shortcomings. For example, when at rest, a conventional dolly or hand truck places the entire load far in front of the centerline of the axles, which makes it necessary to apply a significant force to pull the handle back to bring all the weight of the apparatus directly over the vertical centerline of the axles, the position needed for the axles to carry the full weight of the load. In travel mode, the weight shifts slightly behind the axle resulting in the need for a constant lifting force on the handle. Also, the distribution of weight may make the dolly or hand truck difficult to turn or maneuver.

Another drawback of conventional dolly or hand truck designs is that the angle of the load being carried shifts with the angle of the handle, thus potentially leading to spillage of the contents or preventing a container from being filled as much as it otherwise could be.

It would therefore be advantageous to provide a dolly or hand truck that is particularly well adapted to moving containers and other loads, and that requires reduced effort to move and maneuver. It would also be advantageous to provide a dolly or hand truck that distributes weight in a superior manner, and prevents spillage of loaded containers.

SUMMARY OF THE INVENTION

This invention relates to a transportation dolly or hand truck for one or more containers or objects to be transported. One embodiment involves a single handled two-wheeled gimbaled bucket dolly, specifically designed to lift, transport and pour the contents of a generic 5-gallon plastic bucket with minimal operator effort. This design can be combined with a second gimbaled bucket dolly into one unit allowing for lifting, transporting and pouring the contents of two generic 5-gallon buckets. The dolly can be manufactured in any suitable size so as to carry other sized or larger containers, including but not limited to a 15-gallon nursery container.

According to one or more embodiments, an apparatus for transporting a bucket or container may comprise a rigid frame having a pair of forked frame members defining a gap between them, and a levered handle extension angled with respect to the forked frame members. A pair of wheels may be attached respectively to each of the forked frame members. A pair of mounting supports may also be located respectively on each of said forked frame members, with a container ring pivotally attached to the mounting supports in the gap between the forked frame members. The container ring is preferably adapted to securely support a container and pivots with the weight of the container as the levered handle extension is raised or lowered so that the container remains in an upright position regardless of the position of the levered handle extension. The container ring may take the form, for example, of a rigid circular band with two posts on its outer periphery on opposing sides, each of the posts positioned in a receptor (e.g., hole, slot or groove) of one of the mounting supports.

BRIEF DESCRIPTION OF THE DRAWINGS

FIG. 25 shows another version of the vertical support; the lower end of the vertical support could also be connected to the frame ends via holes drilled through the frame ends and with connecting bolts.

FIG. 26 shows a comparison between some of the versions of the vertical support.

FIG. 28 shows an embodiment including a bicycle attachment for towing.

FIGS. 31, 32a, 32b and 32c show other variants of the vertical support, which allow movement up and down and around the axis of the vertical support.

FIG. 33-34 show an open ended container holder with a friction lock.

Figure 1:
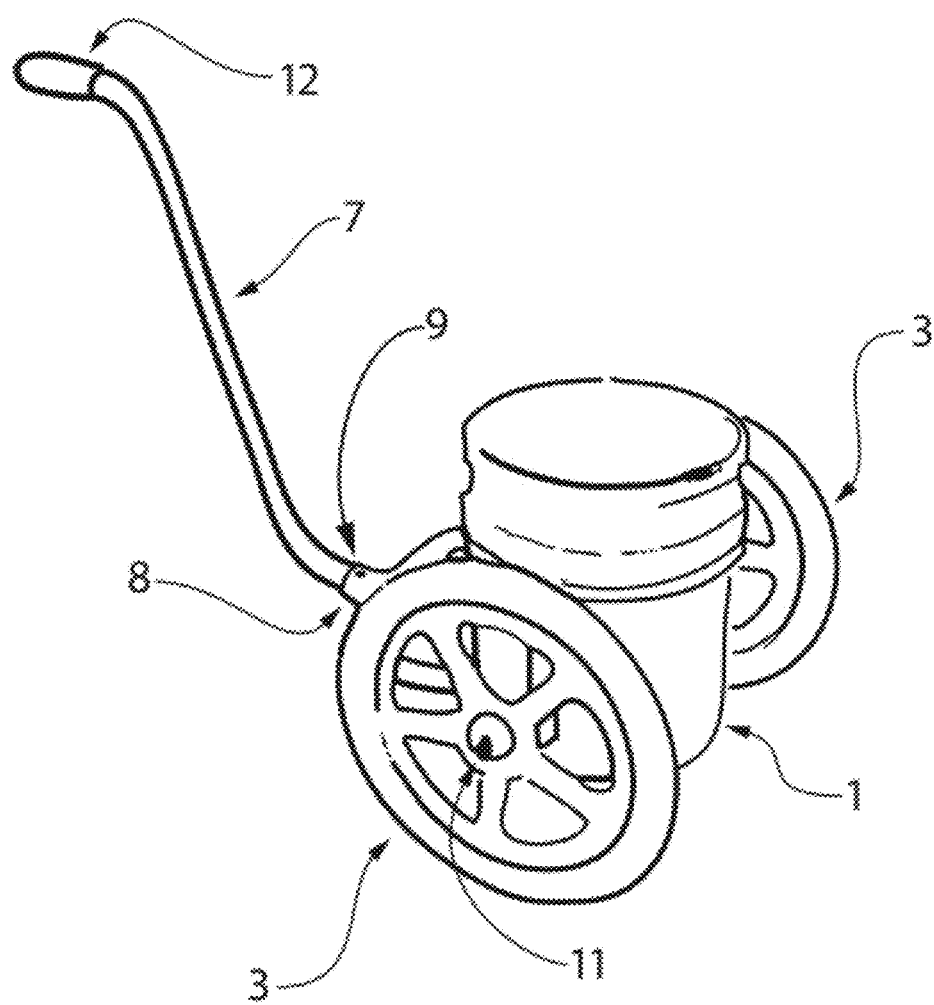
FIG. 1 is a front perspective view of one embodiment of the dolly or hand truck with the bucket installed in the apparatus.

PARTS LISTING 1 plastic bucket
2 C-frame or Frame (C-shape not intended to be limiting)
3 tires
4 vertical support column
5 Container Holder or circular shaped ring
6 bucket clasp
7 handle body (tube)
8 socket for handle
9 fasteners
10 rod (male post for attachment of the "C-Shaped" Cross Member).
11 fasteners to axle for tires
12 handle grip
13 Handle mount for D-shaped handle
14 D-shaped handle
15 protruding posts or male parts (from circular container holder)
16 axle (for mounting wheels)
17 female socket or notch or slot or receptor (for accepting male posts from circular container holder)
18 & 19—independent wheel suspension or springs or shocks
20—fold down kick stand
21—disc brake lever
22—disc brake assembly
23—disc brake cable
24-26—bucket tilt locking device
27—motor
28—motor drive cover
30 first vertical support end (top)
32 second vertical support end (bottom)
34 ribs in vertical support
36 grooves in vertical support
38 first hole in lower or second vertical support end
40 second hole in lower or second vertical support end
42 third hole in lower or second vertical support end
44 inserts for container holder
46 basket
48 male portions in basket for connection with vertical support slot
50 flat insert
52 insert for container holder for items or containers that do not have a flange or lip
54 connector for vehicle (bicycle)
56a first part of container support holder
56b second part of container support holder
58 first or inner vertical support component
60 second or outer vertical support component
62 strap
64 gate for container holder
66 rear portion of container holder
68a, 68b front portions of container holder
70a, 70b grasping ends

DESCRIPTION OF THE PREFERRED EMBODIMENTS

According to certain embodiments as disclosed in this application, a wheeled dolly or hand truck is provided that allows for the easy transport and pouring of a container or bucket across an uneven terrain or surface. A preferred embodiment involves a two-wheeled dolly, which is useful for the transporting and pouring of a bucket, such as a generic 5-gallon plastic bucket (1) or other container. This device is ergonomically designed to minimize work effort by the placement of the load weight, initially slightly rearward of the centerline of the axles when the dolly is at rest, to slightly forward of the centerline of the axles during transport effectively making transport almost effortless. In addition to its ergonomic design, the bucket preferably has a unique ability to rotate a full 180 degrees on its horizontal axis, through the use of a gimbaled circumferential ring (5), while being held in place by a bucket clasp (6). This gimbaled structure allows the bucket to empty its contents without having to lift the entire weight of the bucket and its payload.

A dolly according to certain embodiments described herein may comprise three main components rigidly joined by three readily removable fasteners (9), thus allowing the dolly to quickly and easily be dissembled for transport, then reassembled again at its work destination.

Figure 2:
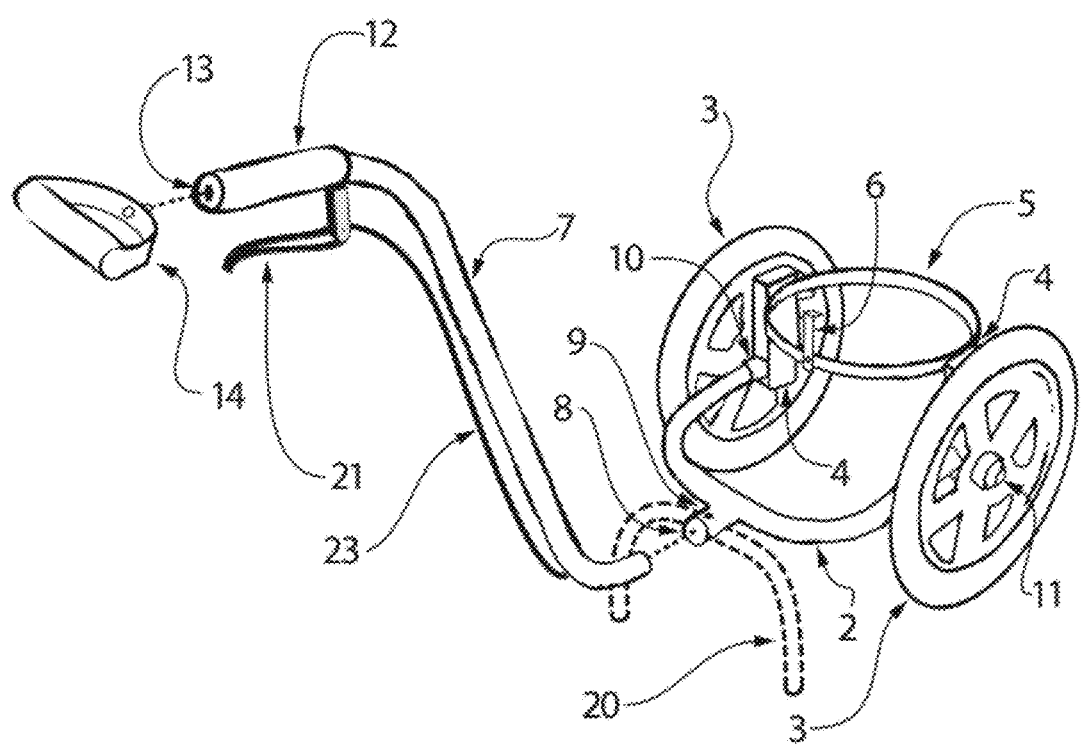
FIG. 2 is a rear perspective view (without the bucket) of another embodiment of the dolly or hand truck, providing for a braking system and a fold down kick stand brake 20.

FIG. 2 shows an embodiment of a dolly without the bucket. The dolly preferably comprises an open horizontal "C" shaped frame (2) that is rigidly attached to two vertical columns (4) through the use two of removable fasteners (9) and a horizontal pivotal circumferential ring (5) with its two protruding posts (15), which become locked into place in the top of the vertical columns (4) during assembly. Alternatively, the vertical supports may have vertical slots for the fitment of the circumferential ring and would be attached to tabs protruding from the C-frame using threaded fasteners.

Completing the dolly, an "S" shaped tubular handle body (7) is slipped into its connecting socket (8) and held in place with a removable fastener (9), while two large pneumatic tires (3) are attached to the two axles (16) with removable fasteners (11). Other shapes for the handle body or type of tires, including but not limited to self-sealing or solid foam, can be used.

Also shown in FIG. 2, either an elastomeric handle grip (12) or a detachable "D" shaped handle (14) can be used to facilitate the pulling of the dolly over uneven terrain, rough surfaces or large objects such as those found when camping or prospecting.

Figure 5:
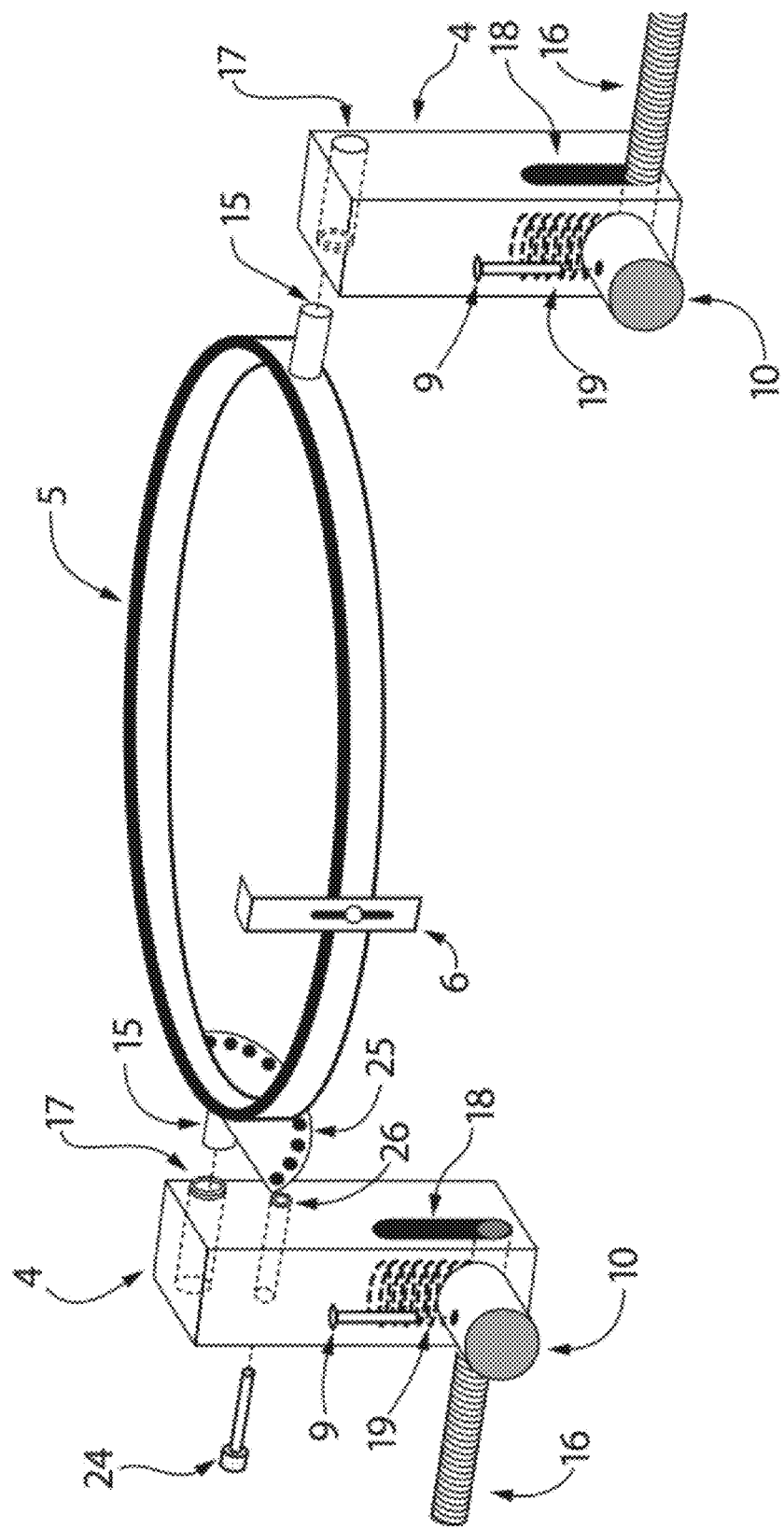
FIG. 5 is an exploded view of another embodiment of the dolly or hand truck, specifically focusing on the two vertical columns fitted with an axle, a socket to accept the post of the circumferential ring, a circumferential ring, and a circumferential assembly rod; there is also shown an embodiment for a suspension system with the following components: a slot 18 for axle travel (shock travel); shock absorber 19 (spring type is shown for example); bucket angle locking pin 24; bucket angle locking plate 25; and collar 26 for bucket angle locking pin 26.

A contributor to the strength of the design is in the assembly of certain of its structural components. FIG. 5 shows each vertical support or vertical column (4) has a female socket (17) securely welded onto the top inside surface to help accept the protruding posts of the circumferential ring (5). Extending out the front surface of the vertical column (4) is a rigidly attached circumferential rod (10), which acts as a male post for attachment of the tubular "C" shaped metal cross member having the mating socket for the horizontal cross member or frame (2). On the outside bottom of the vertical columns is an axle (16), which is securely welded for attachment of the pneumatic wheels (3) as shown in FIGS. 1-4. Alternatively, the vertical supports could have a vertical slot at the top of the support to accept the protruding posts of the circumferential ring. The vertical supports may be attached to tabs that extended up from the "C" frame using, e.g. threaded fasteners.

Materials

The dolly may be fabricated of rectangular and/or round steel tubing and preferably has large pneumatic wheels, e.g. 14 inch wheels. It can however be made using rectangular tubing, stamped steel parts or a combination of several different materials including alloys, steel, aluminum, carbon fiber and other lightweight composite plastic materials; these materials should be sufficient in structure to support the weight of a fully loaded bucket or container. The wheels can be of any size, larger or smaller, and the tires can be non-pneumatic, semi-pneumatic, cast or molded.

Other Possible Embodiments

Various optional components of features may be provided that can be utilized individually or in combination depending upon the needs of the user. These additional components and features include:
1. Independent wheel suspension (FIG. 5, items 18 & 19);
2. Bucket tilt locking device (FIG. 5, items 24, 25 & 26);
3. Fold-down kick stand (FIG. 6, item 20) (FIG. 3, item 20);
4. Disc Brake lever (FIG. 6, item 21) (FIG. 3, item 21);
5. Disc Brake cable (FIG. 6, item 23) (FIG. 3, item 23);
6. Disc Brake assembly (FIG. 3, item 22);
7. Motor (FIG. 6, item 27); and
8. Motor drive cover (FIG. 6, item 28).
9. Accessory kit to combine two bucket dollies into a single, side-by-side, double unit.
10. A larger version to accommodate and lift standard 15-gallon nursery containers or any other size containers.
11. Removable shopping basket.
12. Adjustable towing arm (which can be connected to or integrated with the handle body and have a means for connecting with a vehicle or bicycle, including without limitation: a clamp, hook, or ball/socket attachment).
13. Inserts to carry items without lips such as a standard propane tank or a beer keg.
14. Customizable ring covers or inserts to allow for carrying smaller or oddly sized containers.
15. Rectangular ring and inserts to carry rectangular buckets or pails.
16. A dolly plate allowing users to carry oddly shaped items in a fashion similar to a standard vertical dolly Proposed Uses:

The dolly vehicle described herein may be used either by professionals or amateur "do-it-yourself" homeowners and renters; in addition, condo-owners, sportsmen, apartment managers, campers or anyone, who wishes to transport a container, including without limitation a 5-gallon bucket with contents, over uneven and difficult terrain, will find this vehicle particularly useful.

Certain embodiments of the dolly design can also be used for the mixing and pouring of compounds such as cement, plaster, stucco or food products and the dispensing of liquids such as solvents, water, sand, gravel or any loose bodied material that would need to be poured from a bucket; this device can also be used to transport any object that can fit in a plastic 5 gallon bucket or be constrained by the circumferential ring or container holder.

This embodiment in essence involves a combination of a bucket transportation dolly and a gimbaled pouring device specifically designed to the fitment of a generic 5-gallon bucket, or by combining two of the devices two 5-gallon buckets can be moved simultaneously while still allowing each to be poured separately. It has the ability to transport liquids or solids and has the added ability to pour such objects without the necessity of lifting and holding the weight of a loaded or partially loaded bucket. It also has the ability to quickly and easily breakdown for ease of transportation.

Certain embodiments of the invention may utilize a rigid tubular horizontal C-shaped or U-shaped lower frame member with laterally spaced wheels, which are attached to a pair of vertical columns or supports. A gimbaled horizontal ring or container holder is attached to the top of the vertical columns above the centerline of the wheels and allows the 5-gallon bucket or a similar container to have sufficient ground clearance and the ability to freely swivel and pour its contents. A bucket clasp, attached to the rear of the horizontal ring prevents the bucket from falling out of the ring when the bucket is being emptied or when at rest.

For greater stability, two independent wheel assemblies are preferably attached to the bottom outmost sides of the vertical columns extending the footprint to the outside of the dolly frame. A handle, which may be removable, is preferably attached through a connecting socket permanently affixed to the centerline of the horizontal C-frame cross member.

For transport, the entire assembly can easily be taken apart into its basic components, with all parts, save the handle, ring and the two wheels, stored in the bucket, allowing for easy storage or transport in any vehicle. The dolly reassembles again in less than a minute once at its desired location.

With oversized wheels and a rigid frame, the bucket dolly can provide the capability to wheel with ease over almost any terrain while keeping the contents of its bucket horizontal to the ground generally at all times. It is ideally suited, but not limited to the carrying of liquids without spilling, the mixing and pouring of compounds such as cement, plaster, stucco or food products, the dispensing of solvents, water, sand, gravel or any loose bodied material, which would need to be poured from a bucket—all without undue effort so as to prevent any back injury to the user.

A bucket transporting/pouring device comprised mainly of three main structural components, when rigidly joined by the use of three removable fasteners, form a bucket-dolly of unique design. The preferred embodiment structure consists of an open horizontal "C" shaped frame, a handle body, two vertical columns from which large pneumatic tires and a horizontal pivotal circumferential ring are attached.
1. A tubular "C" or "U" shaped metal frame of such diameter and wall structure as to act as the primary cross member to which all other elements are attached acts as the main load bearing structure.
2. Two structural vertical columns each are rigidly attached to the "C" shaped metal frame through the use of easily removable fasteners. Each vertical column has a female socket securely welded or formed onto the top inside surface, for attachment of the bucket supporting circumferential ring, a welded circumferential assembly rod extending out the front surface at the base for attachment of the tubular "C" shaped metal cross member and an axle rigidly welded to the bottom outside surface, for attachment of the pneumatic wheels.

Alternatively, the vertical supports could have a vertical slot or receptor at the tip to accept the bucket supporting ring, and two holes at the bottom of the support to accept threaded fasteners that would attach to tabs extending from the "C" frame. In this configuration, the axles for the wheels would pass through the "C" frame itself directly below the vertical support members. In the case of smaller wheels, these vertical supporting members would be extended below the "C" frame and the axles attached to the lower portion of the vertical members below the level of the "C" frame.
3. Two wheels of given diameter, each having sufficient strength to support the weight of a fully loaded bucket and frame and are of sufficient size and durability to provide ample ground clearance allowing the bucket to rotate fully above the ground throughout its horizontal axis in all types of terrain including; mountainous ground such as that encountered when working outside while camping, hiking or prospecting, as well as somewhat smoother surfaces such as grass, concrete and asphalt. The wheels slide over the end of the independent axles and are held in place through the use of a quick release fastener at the outmost edge of each axle. The inventors find that fourteen inch wheels work very well; a particular wheel size is for example only and not limiting.

4. An upper bucket support consisting of a circumferential band whose inside diameter is closely matched to the peripheral lip of a generic 5-gallon bucket and firmly affixed with two round protruding posts welded 180 degrees apart, which are of sufficient thickness and stature to support the weight of a loaded 5 gallon plastic bucket.

5. A single "S" shaped tubular handle body consisting of two obtuse angles, each of about 110-130 degrees, with the upper extent having an elastomeric handle grip. There is a small opening in the end of the elastomeric covering allowing the attachment of a rotatable "D" shaped handle (discussed in #6) which can be affixed to the utmost distant part of the handle through a threaded fastener welded in the end of the tubular handle, and is used primarily when the dolly is pulled over uneven terrain.

6. A removable, rotating, D-shaped handle allowing the device to be ergonomically pulled or pushed by the user. The D-shaped handle allows the user to freely rotate his hand altering the relationship of the user to the dolly, especially while pulling, thus allowing for a more relaxed grip and more controlled positioning when the dolly is pulled behind the user. Other sized or shaped handles can be used.

7. An adjustable bucket clasp, consisting of a slotted metal clip attached to the circumferential band through the means of a friction fitted post, or a threaded wing-nut, and extending vertically over and into the top of the bucket thus holding the circumferential band in place while pouring and preventing the circumferential ring from dropping when the bucket device is at rest.

8. In assembly, the circumferential band, with its slotted clip, is attached by placing the two posts in their respective mating sleeves, which are firmly affixed to the inside top of the vertical columns. Once the posts are fitted in their sleeves in their respective columns, the circumferential band is secured in place by the rigid attachment of the vertical columns to the tubular "C" shaped frame. In use, the protruding posts act as rotational gimbals allowing the bucket to remain horizontal to the terrain, regardless of the slope and allowing the bucket to rotate on its horizontal axis thusly pouring its contents.

Alternatively, the circumferential band or container holder would simply drop into the vertical slots, notches, grooves, receptors or female parts in the top end of the vertical supporting members or columns. These vertical slots are designed to accept the protruding posts in the band and would be deep enough to prevent the posts from being jarred out of position. The vertical slots will allow the band to freely rotate and, additionally, allow for quick removal and/or replacement of the circumferential band.

9. As defined in #8, in one embodiment, there is preferably no mechanical fastening of the circumferential band to the vertical columns. The distance between the inside of the two vertical columns and the diameter of the circumferential band at the point of the two post is critical to the functionality of the dolly, as the circumferential band is held in place in its sleeves or slots by the correct spacing of the bottom tubular "C" shaped frame and by the outer diameter of circumferential band measured at the base of the two protruding posts, with just enough clearance added for rotational freedom on the horizontal axis. The distance between the two ends of the frame has some flexibility for adjustment, but it is preferred to stay within tolerances to avoid dislodging the container holder ring from the frame.

10. The bottom end of the lower extent of the tubular handle is removably coupled through a sleeved coupling, which is rigidly affixed to the centerline of horizontal tubular "C" shaped frame at the base of the dolly frame. The entire handle assembly, including the rotating "D" handle, is affixed to the tubular "C" shaped frame through a pinned, push and turn slot in the sleeve or through the use of a readily removable fastener such as a pin with clip, or with a threaded bolt and wing-nut. Other suitable attachment devices or connectors can be used.

Frame:

While certain embodiments are described as having a C-shaped or U-shaped frame, this particular shape is not intended to be limiting. Other shapes and configurations may be used, but the frame should preferably allow a sufficient amount of area or space for the container or bucket (within the gimbaled or pivoting container holder) to pivot and tilt from a first upright position to at least one second dumping or tilted position. A C-shape or U-shape is the most convenient shape for the frame; these shapes allow use of a strip, tube or rod of strong material (including without limitation: metal, alloy, bamboo or wood fibers or plastics). This type of frame may generally have a center portion and two generally terminal ends. The terminal ends of the frame can also have detachable bumpers or LED lighting or headlight attachments (not shown).

Handle Body:

As described above, a handle body is preferably attached or secured to the center area of the frame; this handle body can have a first handle body end and a second handle body end; the second end is connected to the frame; the first end can have a integrated handle or any other type of handle structures (including without limitation: ergonomic attachments or D-shaped handles).

As shown in FIG. 11-14, the second end of the handle body is connected to the frame using a sleeved coupling or two piece clamp or "clam shell" system that is held in place with screws and bolts. This sleeved coupling attachment has a first or upper connection part and a second or lower connection part; each first and second connection parts are removably secured using screws, bolts or some type of friction locks/clamps (similar to what one sees on old pickling jars). The first and the second handle body connection parts (sleeve parts) sandwich the second end of the handle body and a portion of the frame. This sleeved coupling can have at least one hole through the coupling that would mate with an associated hole in the frame and/or second end of the handle body for a more secure connection with a threaded bolt or pin.

Other removable yet secure attachment systems can be used. For example, FIG. 2 shows the frame having a receptor end that engages with the second end of the handle body; this type of engagement can be a male/female type engagement.

The handle can also be secured off center or anywhere along the back of the C-shaped frame, especially when two dollies are connected in the double carrier configuration.

Figure 3:
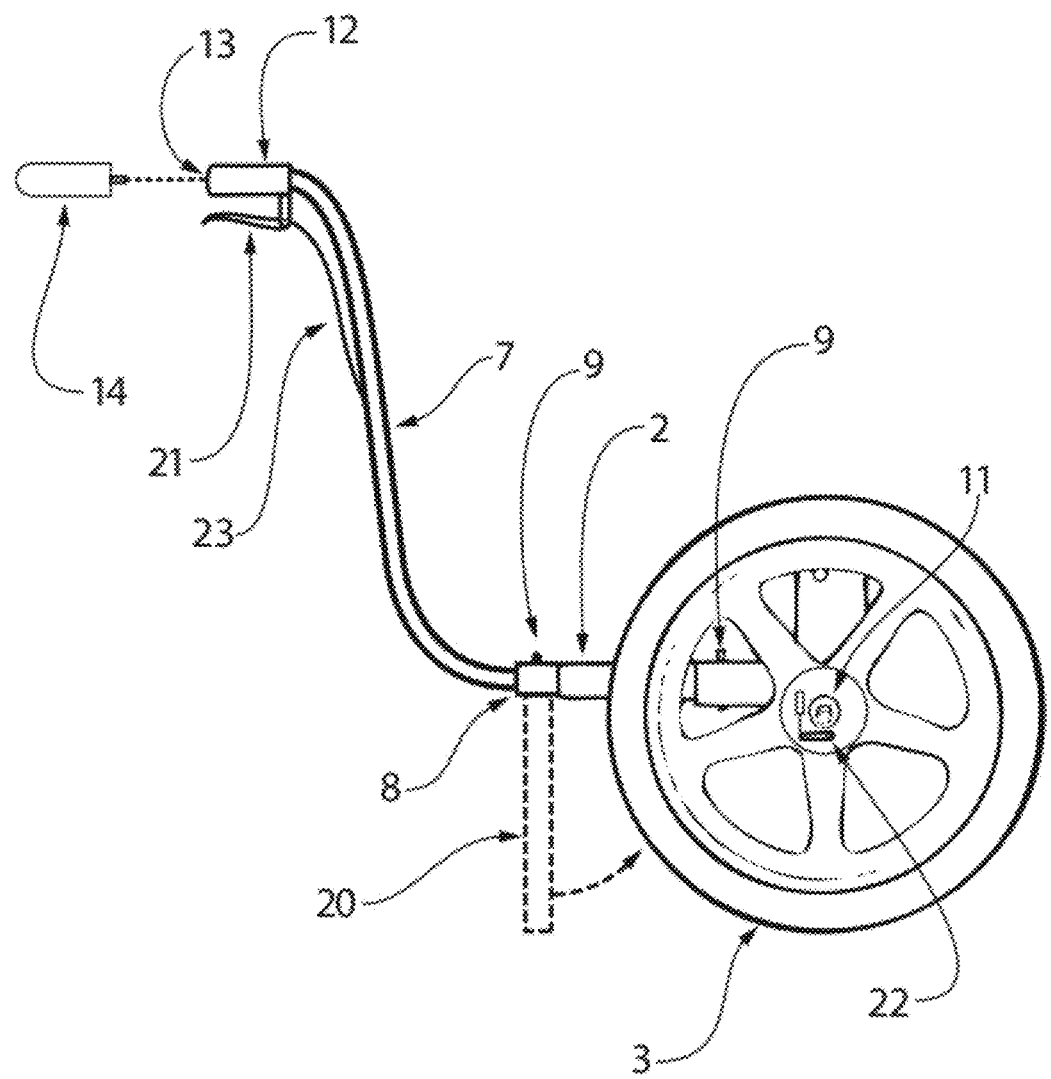
FIG. 3 is a side view (without the bucket) of the embodiment of FIG. 2, which also shows a fold down kick stand 20, a brake handle 21, a disk brake 22, and a brake cable 23.
Figure 4:
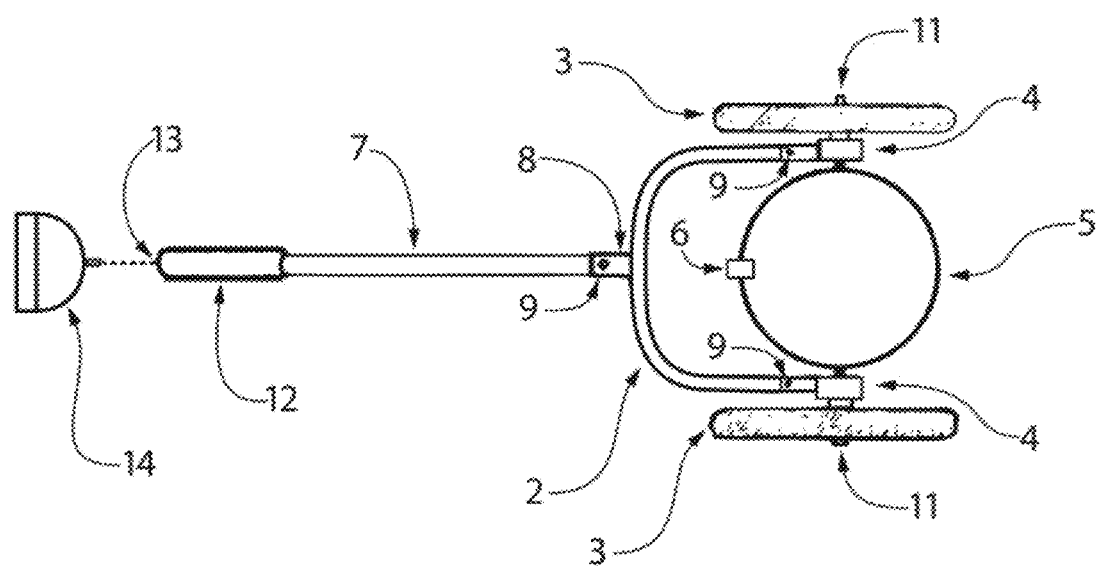
FIG. 4 is a top view (without the bucket) of the embodiment of FIG. 2.
Figure 6:
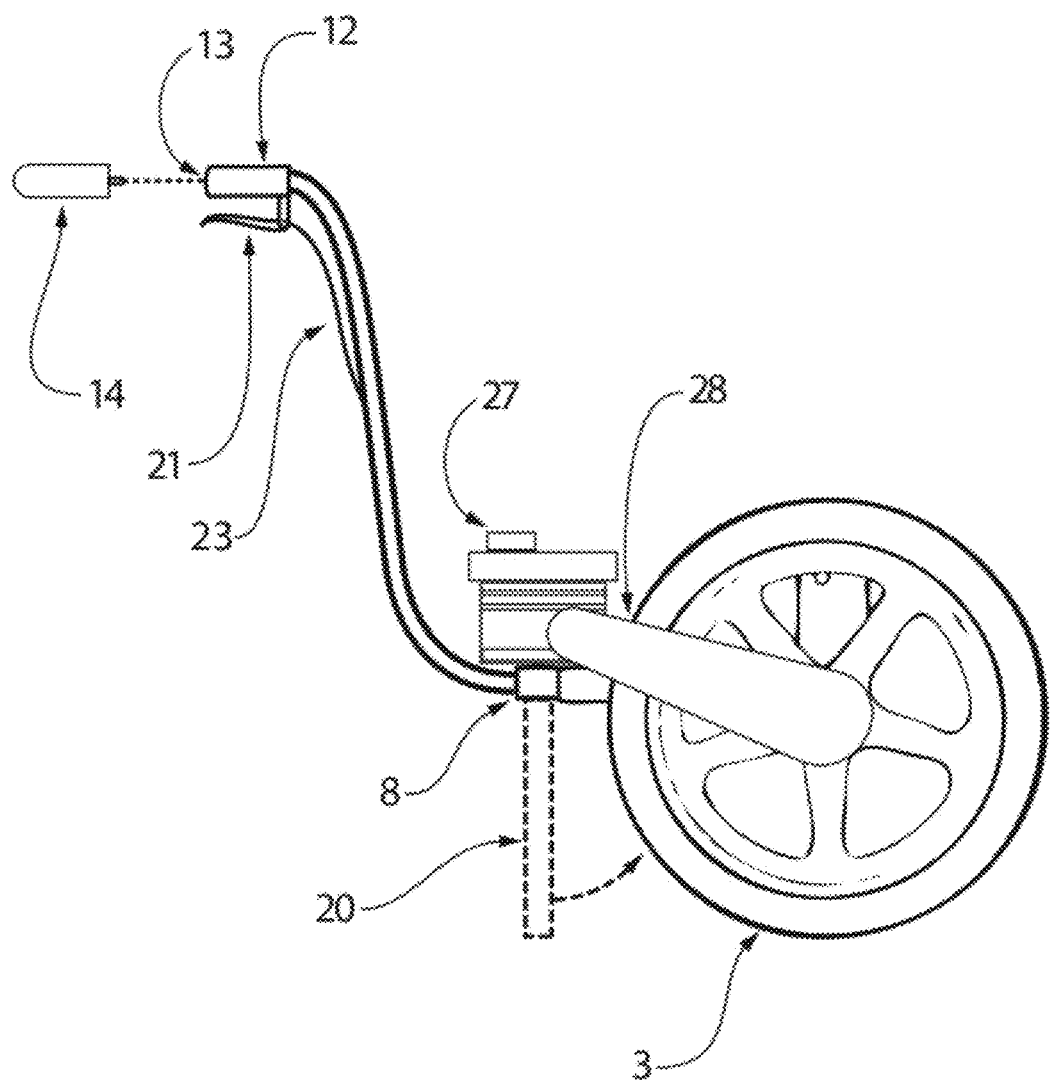
FIG. 6 is a side view of another embodiment with a fold down kick stand 20, brake handle 21, disk brake 22, brake cable 23, motor 27, and drive and drive cover 28.
Figure 7:
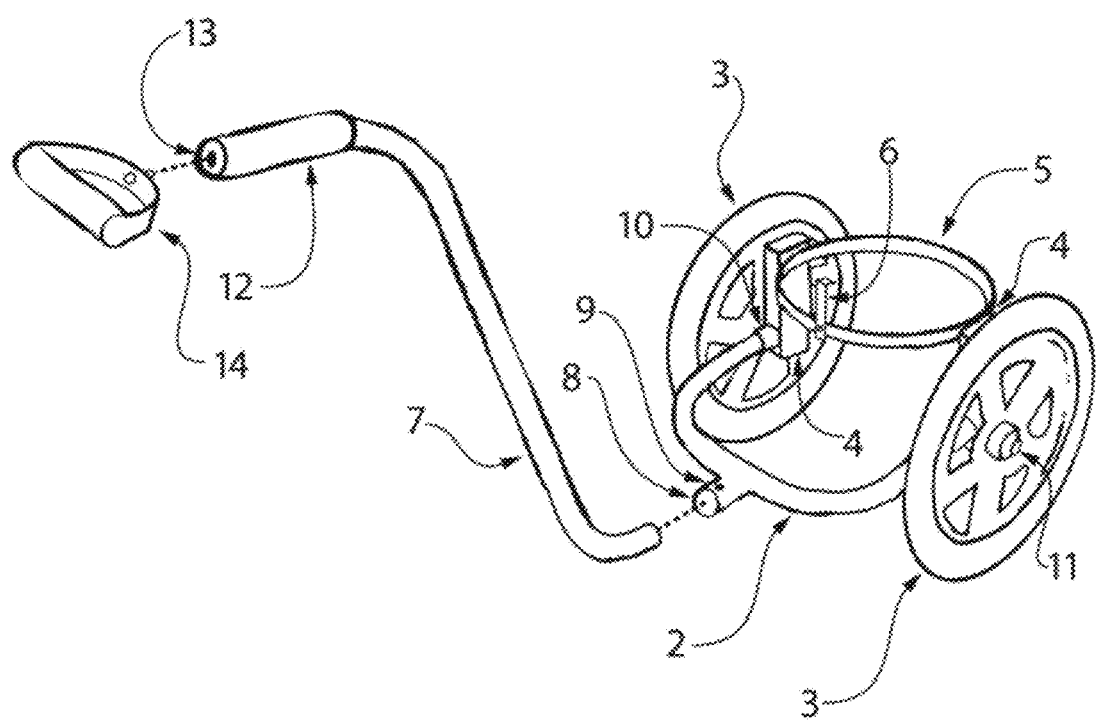
FIG. 7 is a rear perspective view of one embodiment without a bucket and a braking system.
Figure 8:
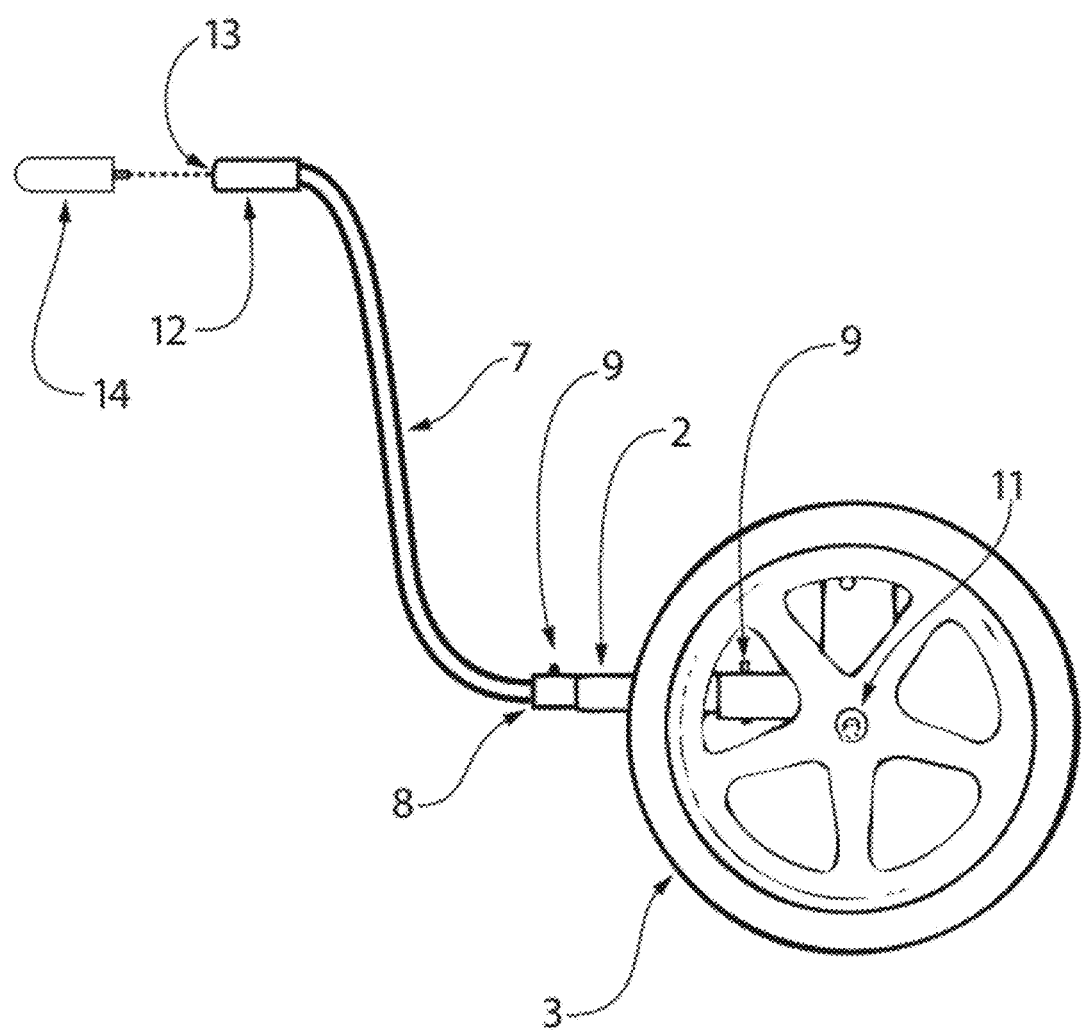
FIG. 8 is a side view of one embodiment without a bucket and a braking system.
Figure 9:
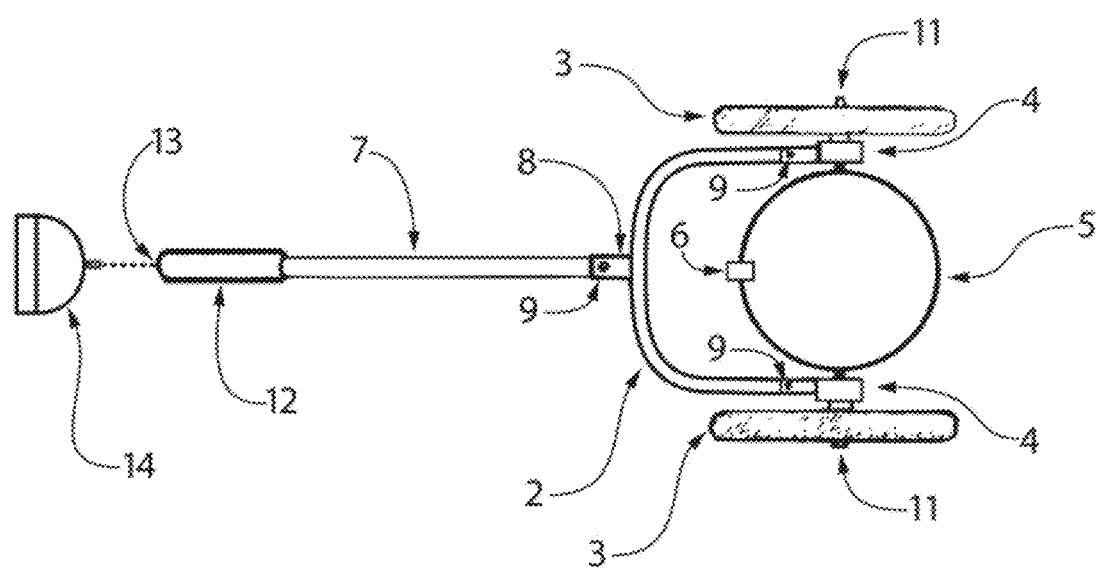
FIG. 9 is a top view of one embodiment without a bucket.
Figure 10:
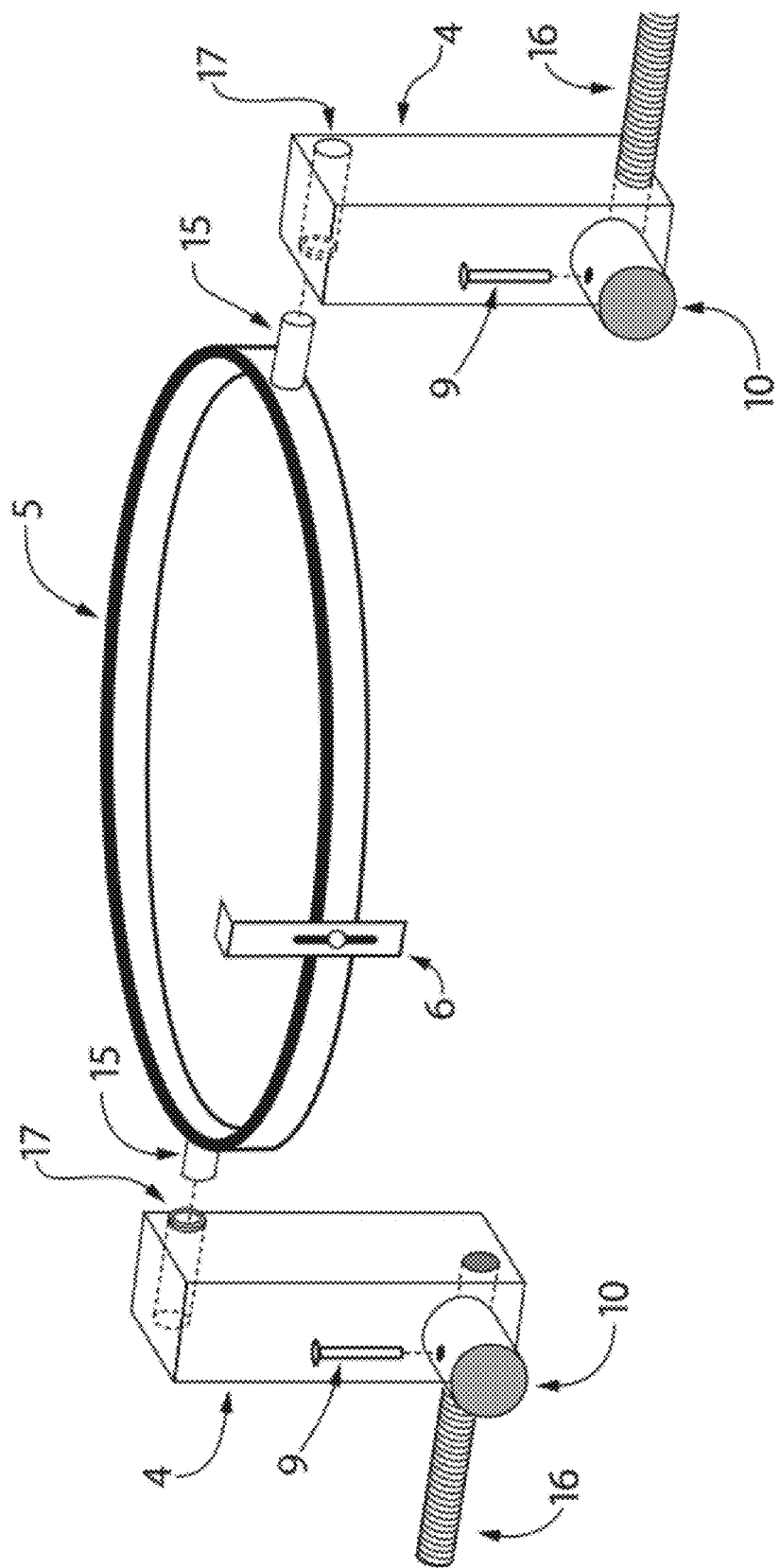
FIG. 10 is an exploded view of another embodiment, specifically focusing on the two vertical columns fitted with an axle, a socket to accept the post of the circumferential ring, a circumferential ring, and a circumferential assembly rod.

A kick-stand or other adjustable stands can be connected to the frame or the connection point of the frame and handle body; see FIGS. 3 and 6. The handle or the first end of the handle body can also have a light (LED) or a horn. The handle can be padded or have a gripping surface.

Mechanical or Vertical Supports:

As previously described, vertical support structures (which can be made from metal, plastic, wood or alloys, etc.) provide support and a connection structure for the gimbaled or pivotable container holder at the first or top end; the vertical support also has a second or bottom end to connect to the C-shaped frame and the supporting wheels.

FIG. 11-18 show another version of the vertical support. In this example, the vertical support has a first vertical support end and a second vertical support end. The top end or the first vertical support end has a slot, notch, groove, receptor or female engagement area. Other versions could have this first or top end of the vertical support be a male engagement area or boss, which would correspond with a corresponding receptor structure on the container holder.

This female socket or slot or notch can have differing widths; the top portion can have a slightly narrower width than the base portion of the notch. See FIGS. 35a and 35b. This slot or notch can also be lined with a flexible rubber or plastic material, cover or lining (i.e. with a different durometer than the rest of the vertical support). This slot or notch can also be the female part to connect with the pivoting boss structure on the container holders.

Other versions of the top portion of the vertical support could have a one way clip or carabineer-style lock (metal loop with a sprung swinging gate or screwed gate) to help retain the boss or male piece from the container holder within the notch/slot of the vertical support top end and until the user desires to disengage the male piece (of the container holder assembly) from the vertical support.

The bottom end or second vertical support end comprises: at least one hole to accept the wheel axle or another connection device to secure the vertical support to the terminal ends of the frame and to the wheels.

In one preferred embodiment, as shown in the FIG. 11-18, the second or bottom end of the vertical support has a first, second and third hole; the first and the second holes of the second vertical support end are oriented perpendicularly to the third hole of the second vertical support end; the first and the second holes of the second vertical support end are parallel with respect to one another.

The terminal ends of the frame are connected to the vertical support through the third hole of the second vertical support end. Once the end of the frame is inserted into the third hole in the lower vertical support end, the first hole allows a bolt or screw to clamp the two sides of the vertical support lower end together. The second hole on the vertical support end allows a bolt or axle to connect to a wheel, track, ski or other transportation part.

Other embodiments allow the first and the second holes to be on the same plane or elevation as the third hole, but this configuration would require holes to be drilled through the terminal ends of the frame to allow passage of the axle or securing bolts through the first and the second holes of the vertical support's lower end.

Figure 16:
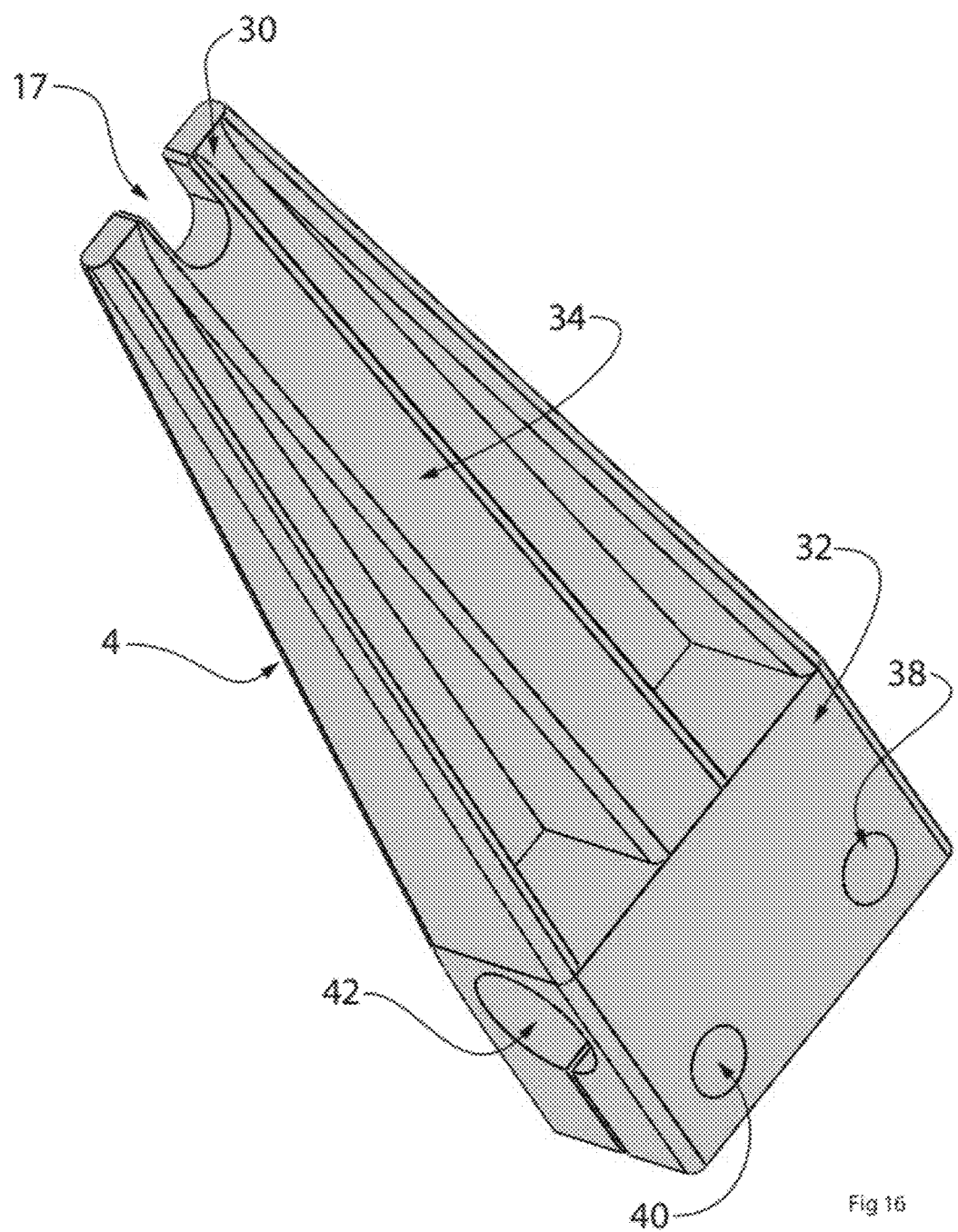
Figure 17:
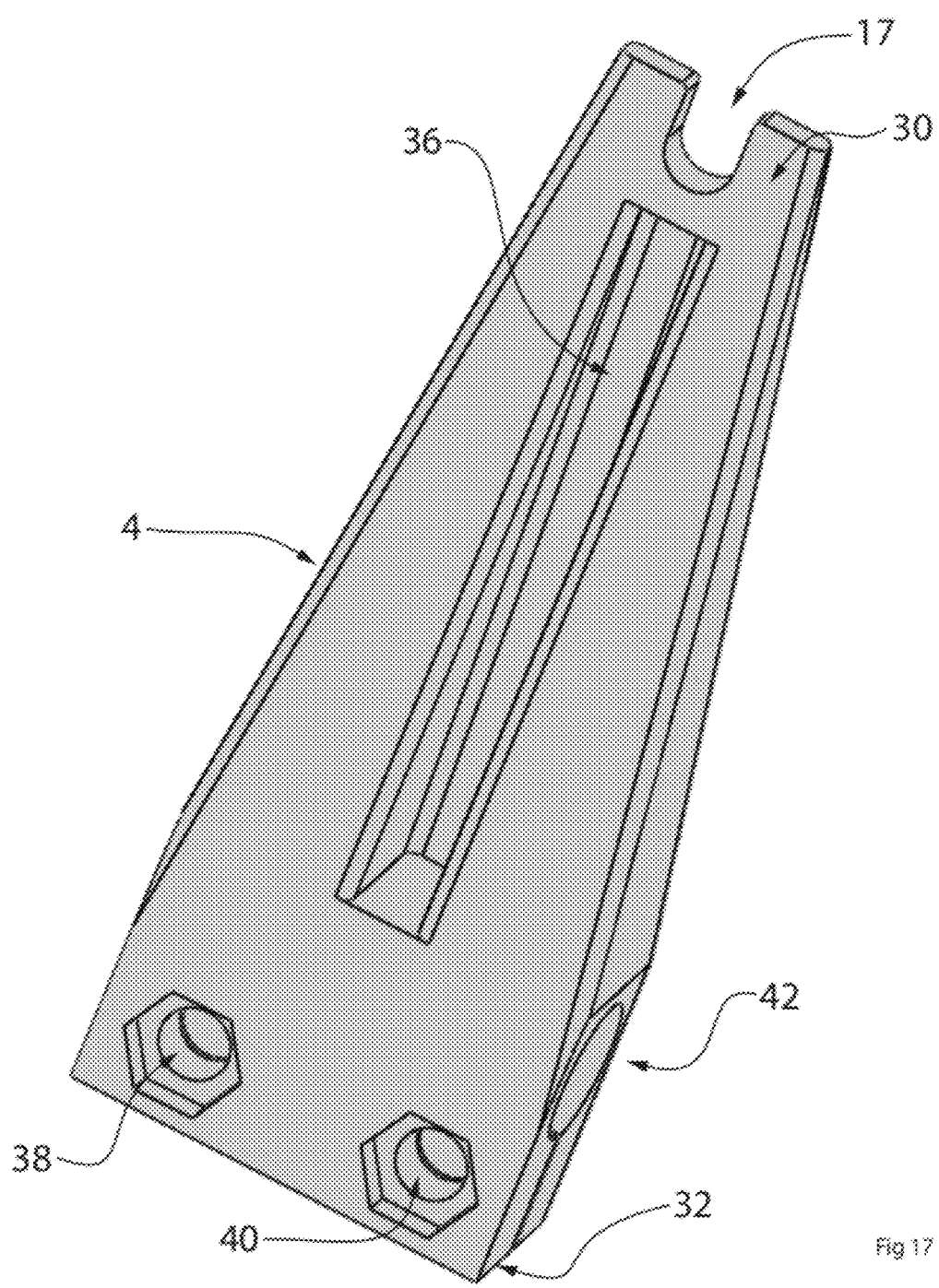

FIG. 16-17 show an embodiment of the vertical support structure that has grooves and ribs; in a plastic molded version, these grooves and ribs were placed to reduce material costs; however, other cross-struts, braces and trusses can be molded into the vertical support structure.

Orientation of the Second Hole (Axle for Wheel):

As previously described, the wheels of the dolly are preferably attached to the right and left frame members or onto the vertical supports, through holes located in the vertical supports. Also, the wheels can also be attached at the base of the vertical supports, via separate right and left axles inserted into holes at the base of the vertical supports. The wheels can be attached with threaded nuts, threaded locking fasteners or other suitable attachments.

The hole on the lower part of the vertical support may be slightly offset from the notch/slot on the upper vertical support end; this offset nature of the second hole for mounting the axle for the wheels allows for a better operation of the device (i.e. tilting and pivoting of the gimbaled container holder from a first upright position to at least one second angled or dumping position). However, other embodiments may allow for non-offset alignment of the top portion (notch) of the vertical support and the wheel axles.

Universal Vertical Support Piece:

These three holes on the lower part of the vertical support member allow the manufacture and use of one universal vertical support part that can be used on either side of the frame; in other words, the parts can be flipped or turned around to be used on either side. This universal part affords greater cost and material savings.

Other versions of the vertical support can simply have one hole centrally located and oriented on the same axis as the notch on the first vertical support end. There will be a second hole perpendicularly oriented to engage the terminal ends of the frame. Other versions can use spring locks, clasps or clips or welds to help secure the terminal ends of the frame to the vertical support.

Finally, specific left and right sided vertical support pieces can also be used; namely, each side would be tailored with the proper wheel axle hole placed slightly behind the upper end notch or slot of the vertical support body.

Figure 11:
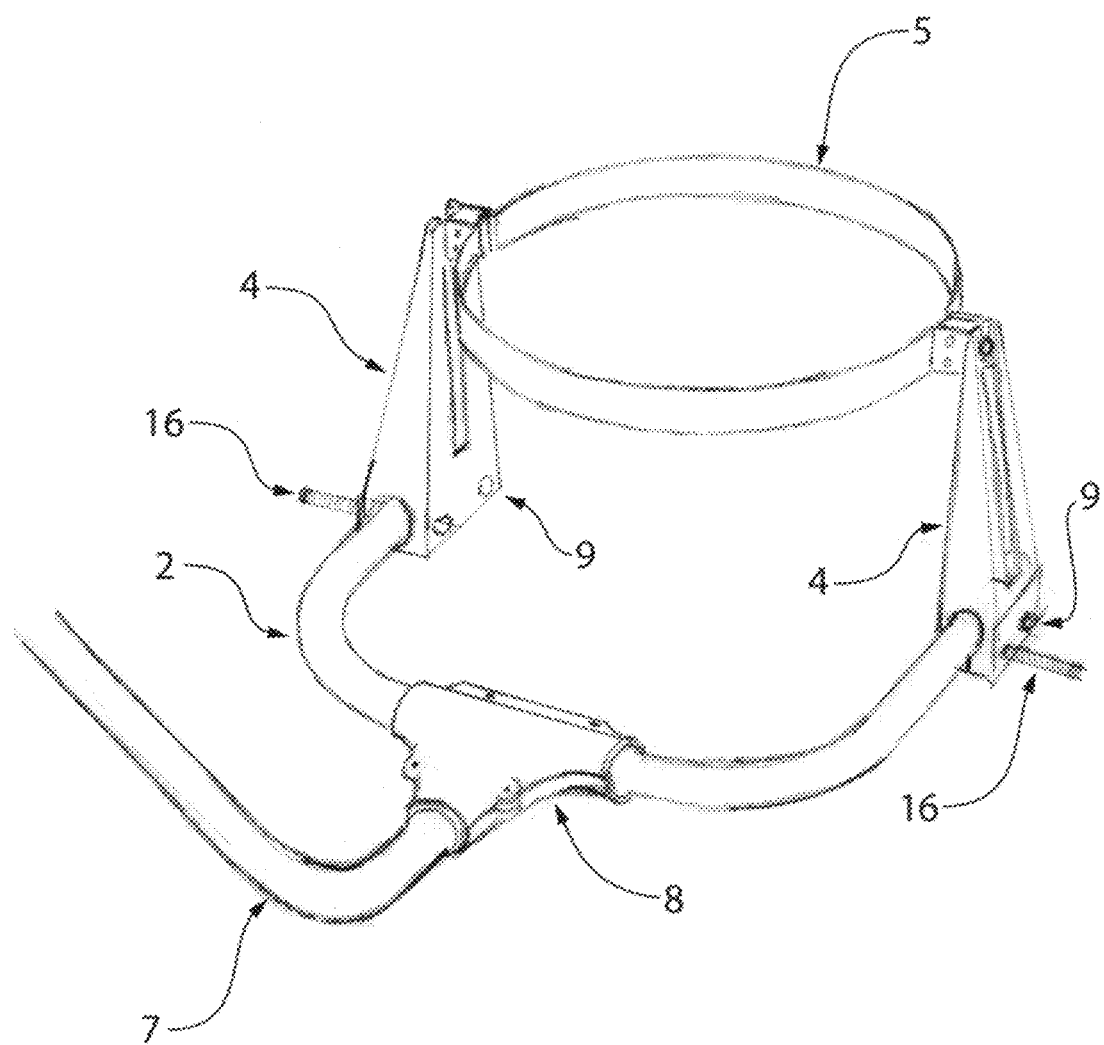
FIG. 11 shows another preferred embodiment with an improved vertical support.
Figure 12:
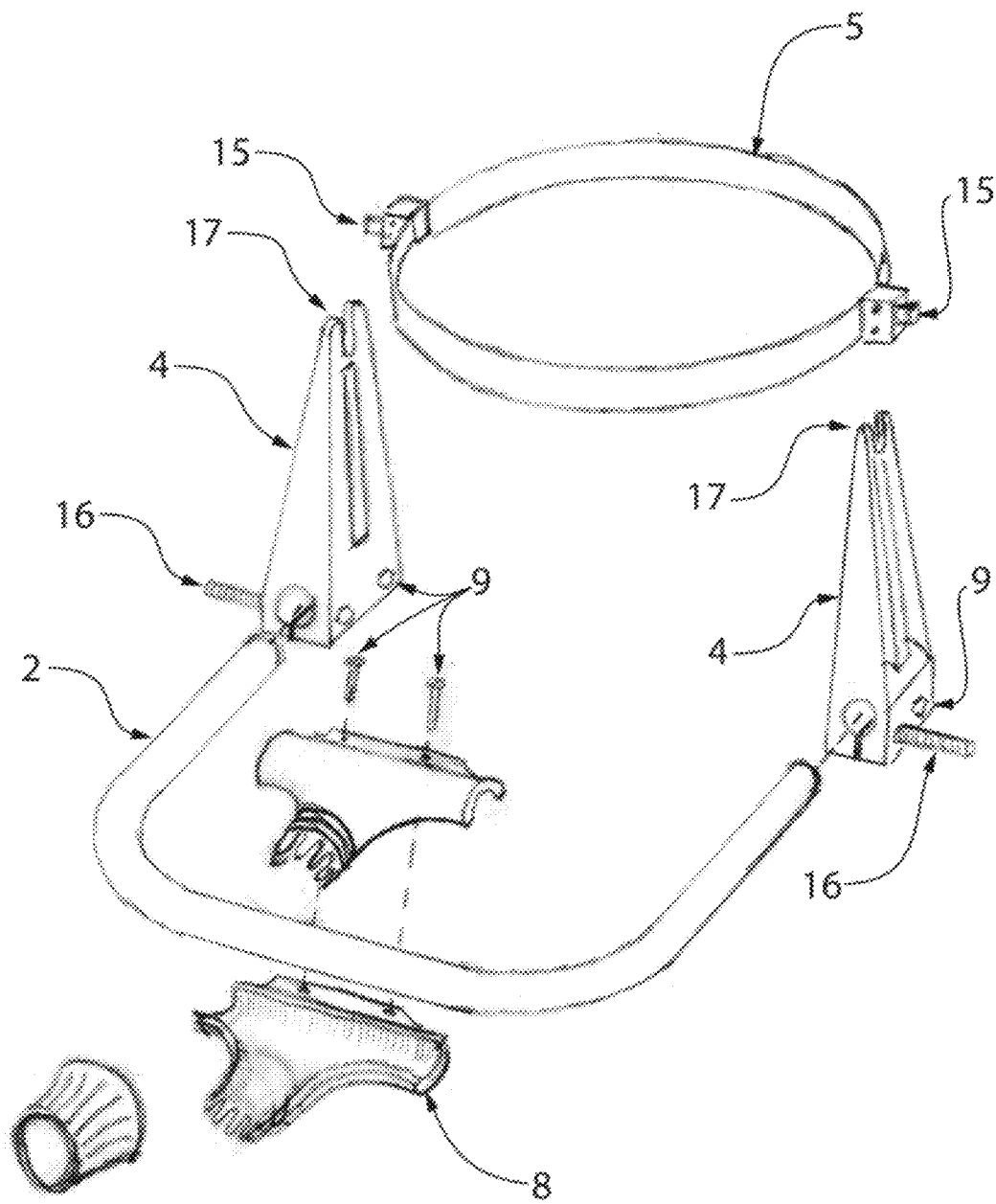
FIG. 12-13 show exploded views with the improved vertical support.
Figure 13:
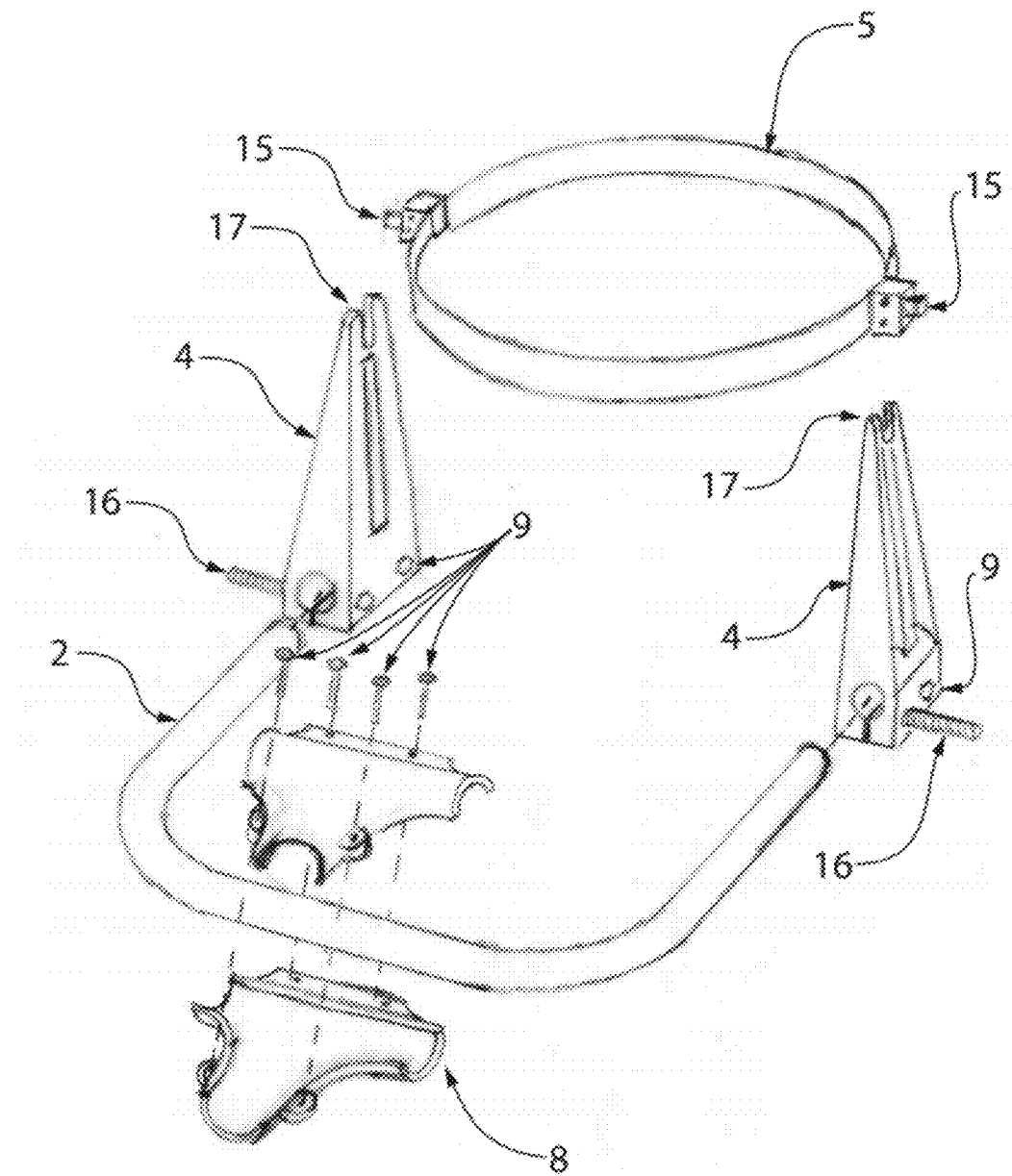
Figure 14:
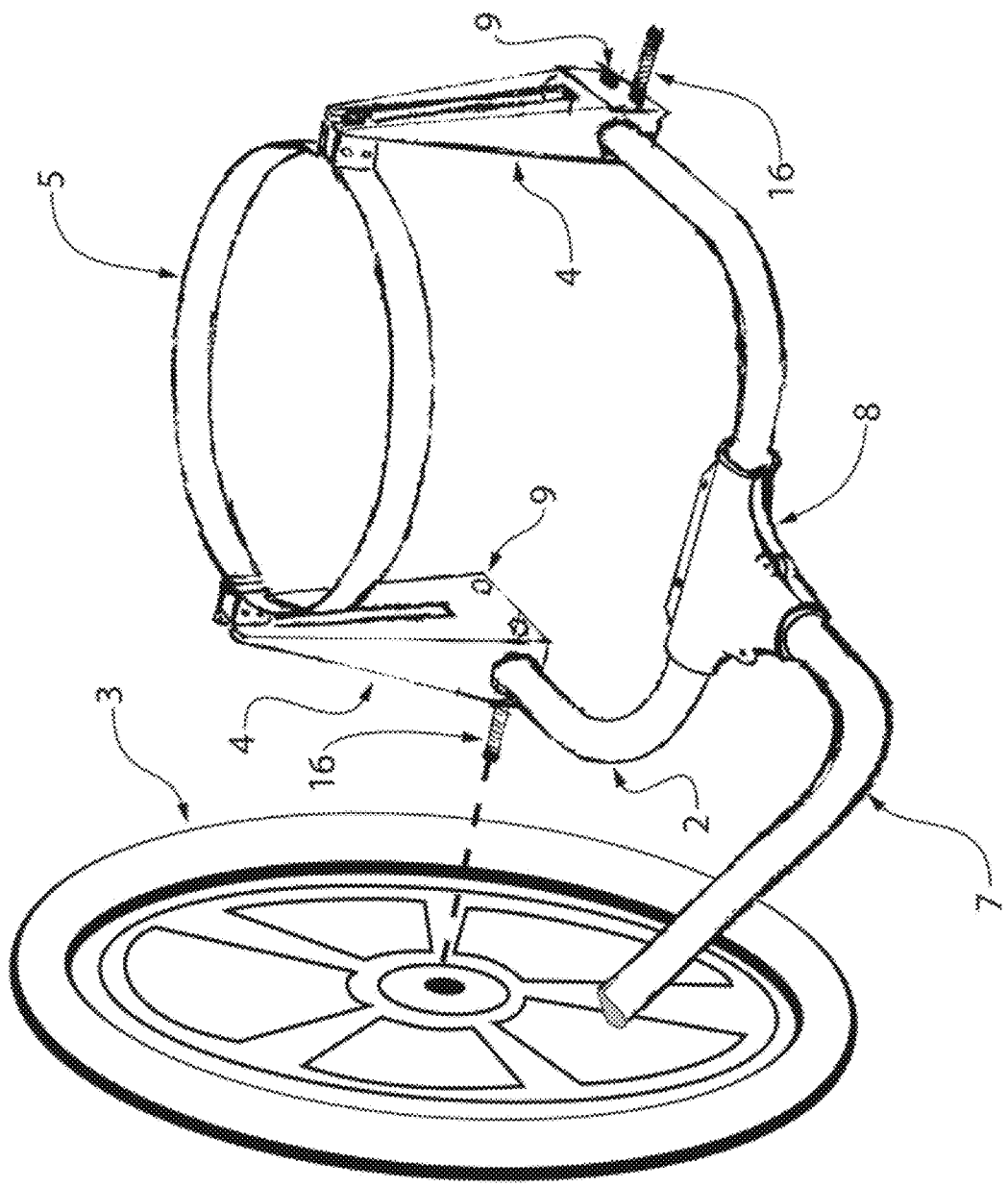
FIG. 14 shows the embodiment with a wheel; note that wheels will fit on terminal ends of the frame or on the lower ends of the vertical supports.
Figure 15:
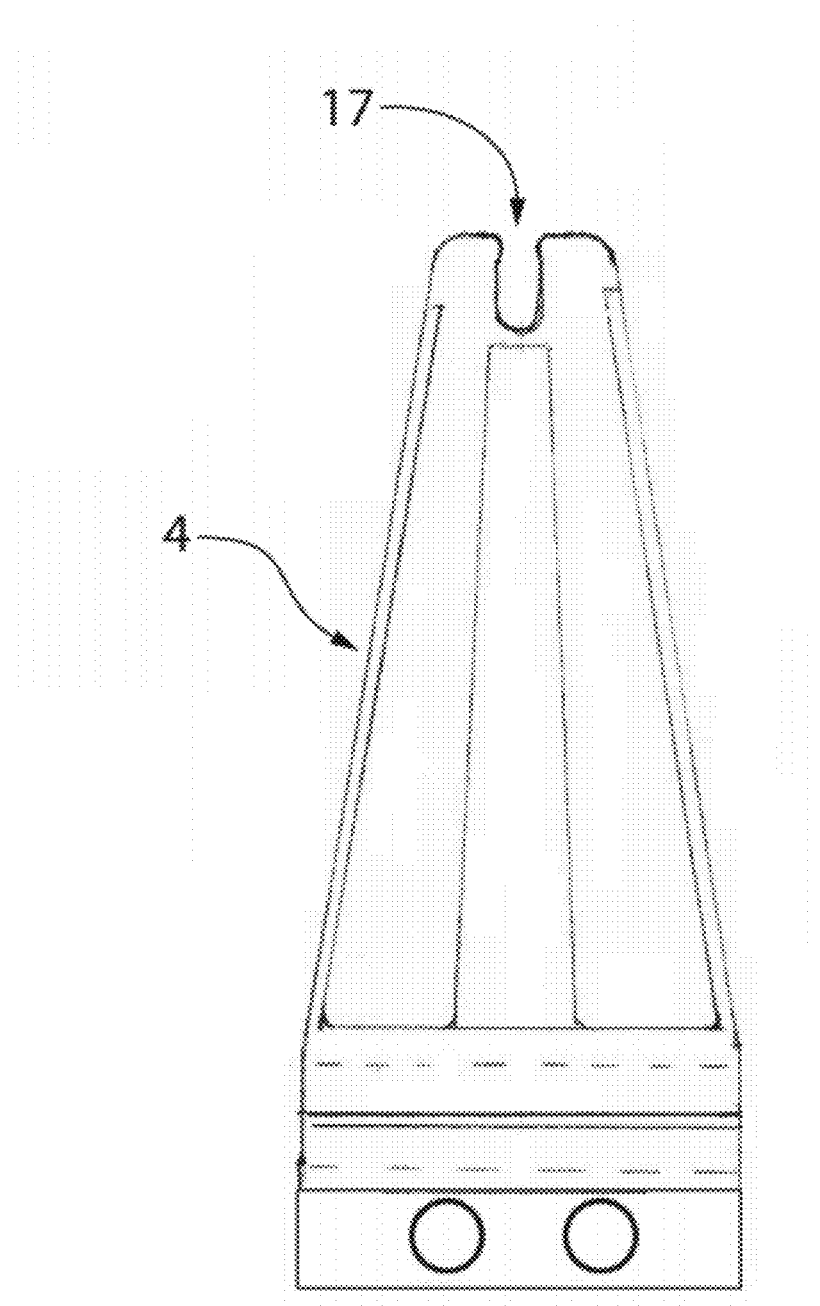
FIG. 15-17 are close up views of the vertical support.
Figure 18:
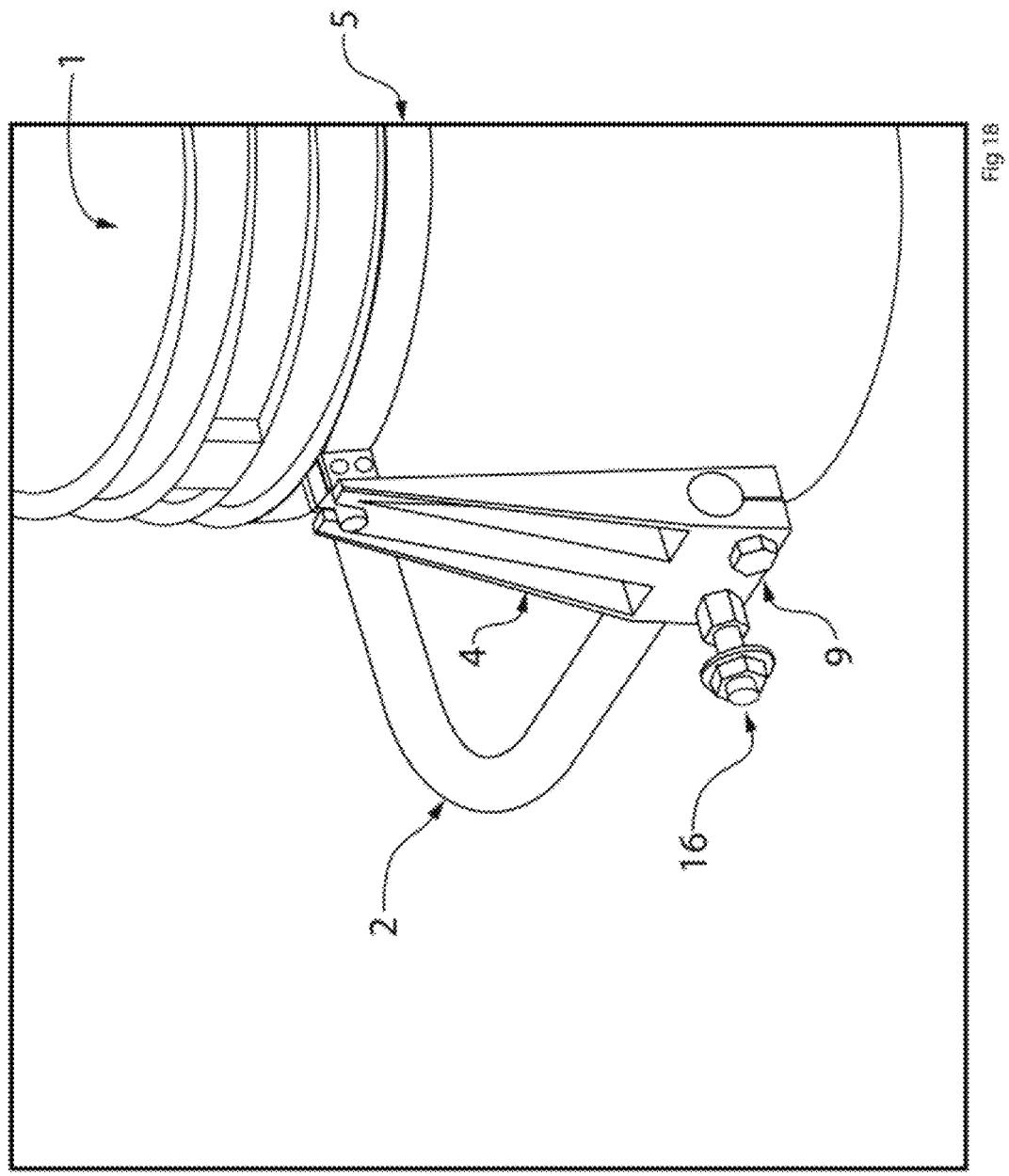
FIG. 18 shows another view and close-up of the vertical support engaging the male piece on the container holder.
Figure 19:
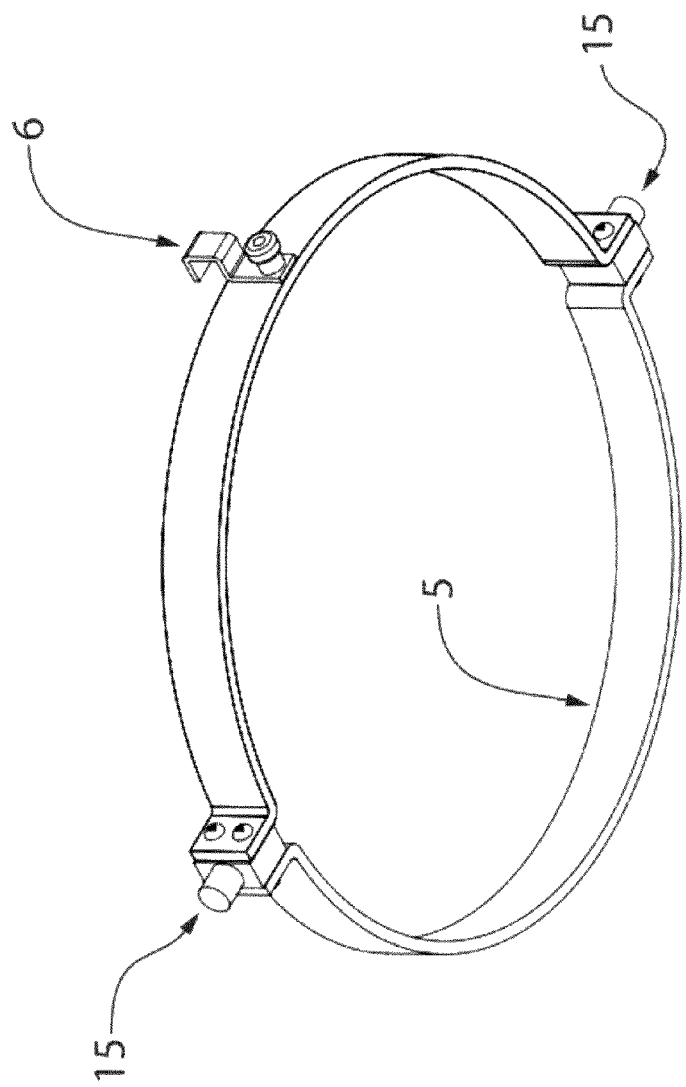
FIG. 19 shows one embodiment of the container holder.

Container Holder:

Depending on the user's preference or the type of container, the container holder can be contiguous without a opening or open like a crab claw. In FIGS. 11 and 18, the container holder is shaped as a circular ring; there is a first side and a second side of the ring container holder; each side of the circular ring or half circle sandwiches a pivot connector that has a boss, post, male part (15) or protrusion that pivotally engages the first or upper end of the vertical support. This pivot connector has at least one hole or opening to allow a connection screw or bolt to help secure the pivot connector with the two sides of the container holder; other shaped container holders can be used, including without limitation, square or rectangular shapes; see FIG. 20.

In other possible embodiments, the container holder can be continuous and have an integrated male piece or pivot connector or boss that engages the female part (slot/notch) on the top end of the vertical support. In another version, this male pivot connector piece could be integrated on a U-shaped clip that engages the container holder body; the container ring body would slip into the U-shaped clip; an additional bolt or screw could secure this male connector piece to that particular location on the ring body.

Figure 33:
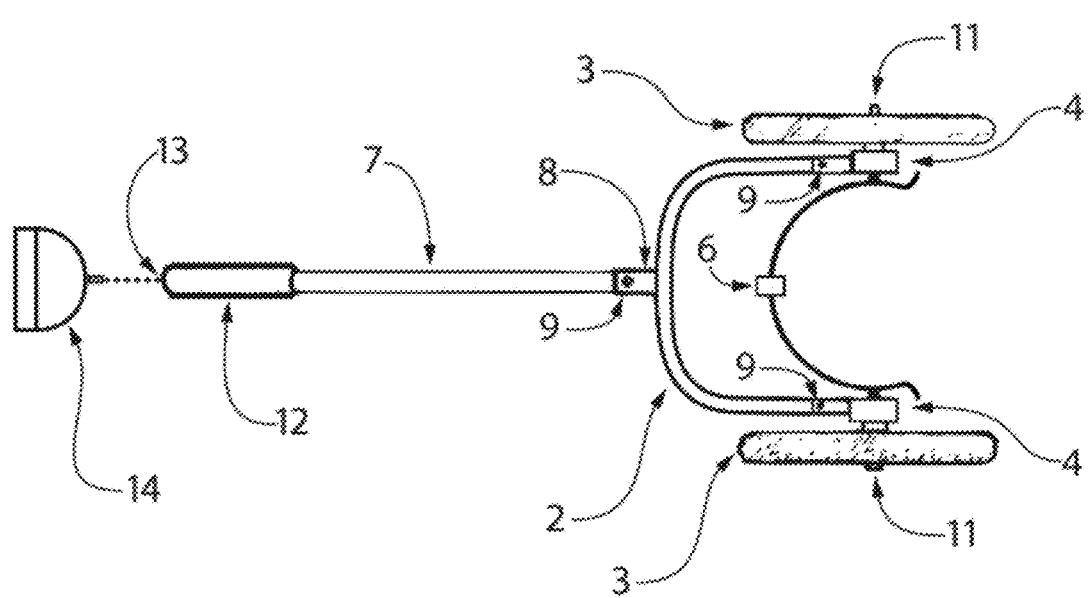

Other types of container holder can be used including, open "crab claw" versions with a support or lock; as seen in FIG. 33-34, the container holder can be open at the forward or front end and have two terminal ends that will form a friction lock around the intended bucket or container.

The shape of the container holder can roughly mimic the C-shape or U-shape of the frame; the container holder has a container holder body with a center and two terminal ends; these terminal ends of the container holder assembly can be bent slightly outwards to create a grasping or friction lock edge. The center portion of the container holder can also have a bucket clasp or lip holder to help hold the container/bucket within the holder or to help avoid unwanted vertical "up and down" movement.

In FIG. 34, another version of the container holder allows use of a multi-piece holder design; the dominant or rear portion of the holder (half circle shaped) is one of the circular holders; there are pivot connectors, which have a boss, post or protrusion that pivotally engage, the first end of the vertical support; and grasping ends. The grasping ends and the half circle shaped container holder sandwich the pivot connector structures, which can be secured with bolts, screws, glue or other secure connection means.

Figure 20:
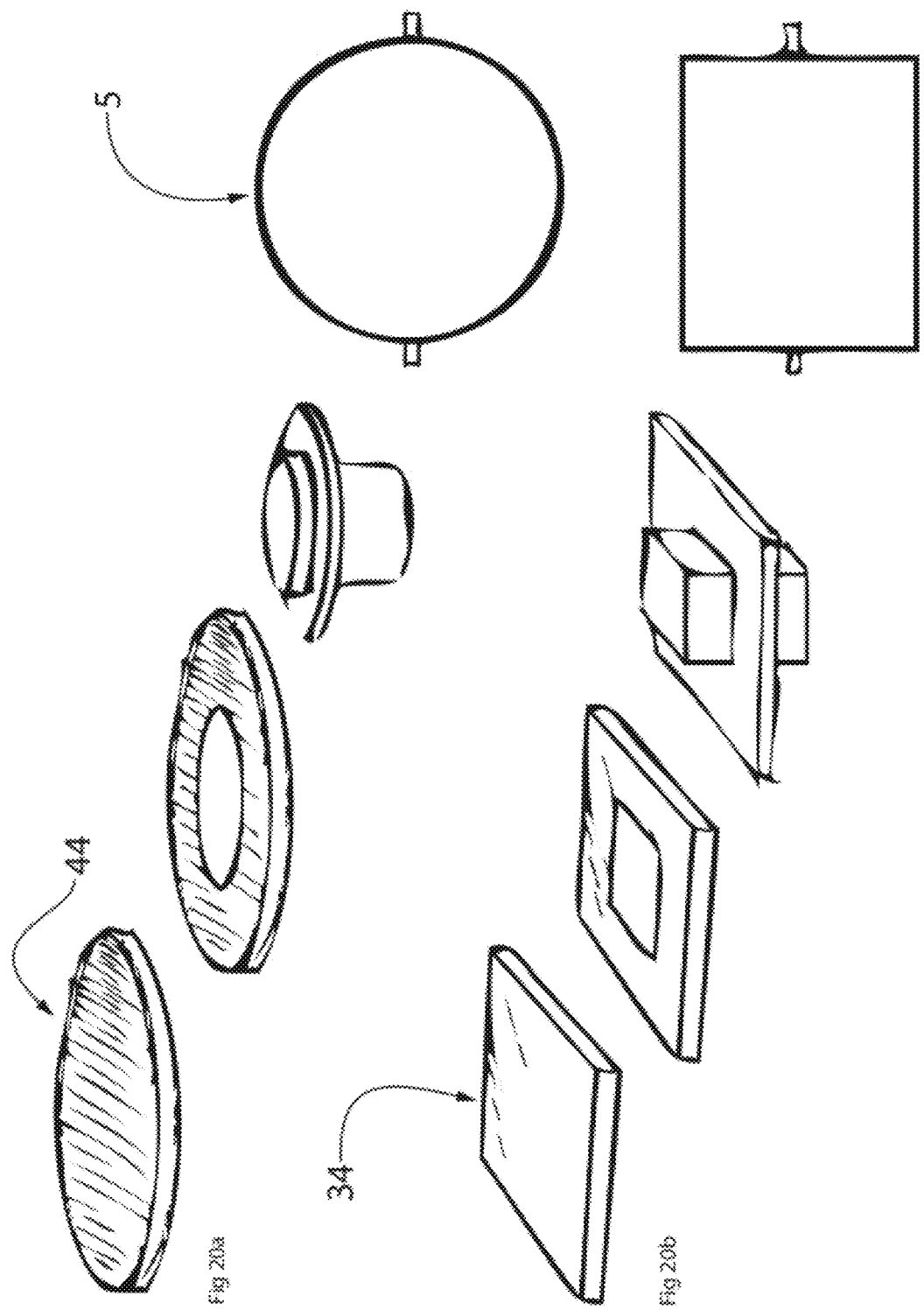
FIGS. 20a and 20b show customizable inserts for various shapes for the container holder, including without limitation: circular and rectangular.

FIG. 20 shows another embodiment of the container holder: customizable insert. A user can also employ a customizable insert for odd shaped containers, which do not appropriately mimic the size and dimensions of the standard container holder. For example, a insert disk can be cut to a particular container shape and placed into the container holder; then, the container can be placed into this insert disk space. Note that other shapes like squares, rectangular or irregular shapes can be accommodated.

This type of container holder or engagement device allows for use of the dolly with heavy containers or containers or buckets that are already filled with material, and the user will not need to lift the container/bucket over and into the container holder as with above mentioned versions of the container holder.

Figure 32A:
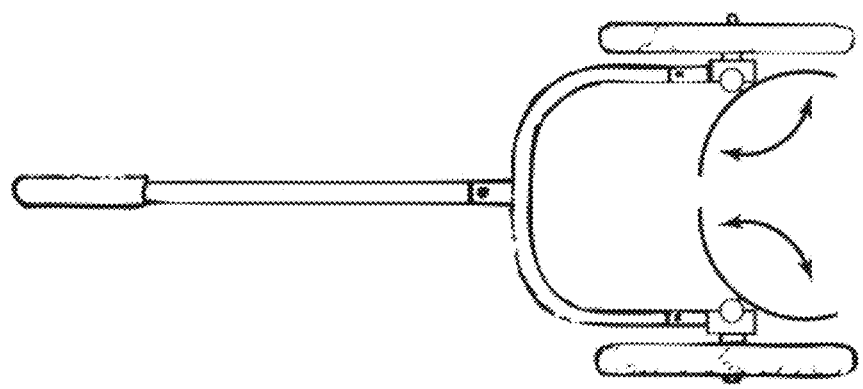
Figure 32B:
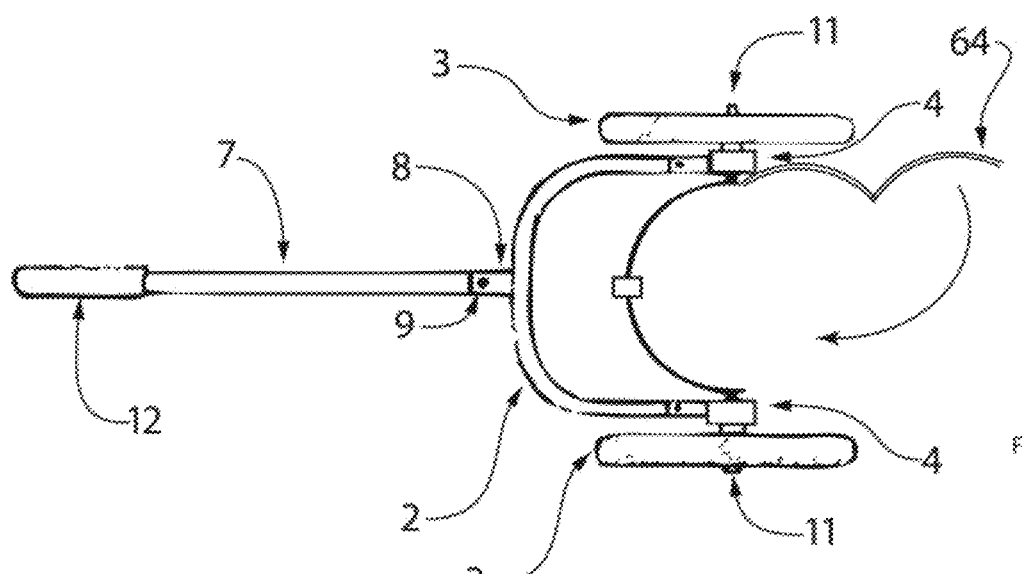
Figure 32C:
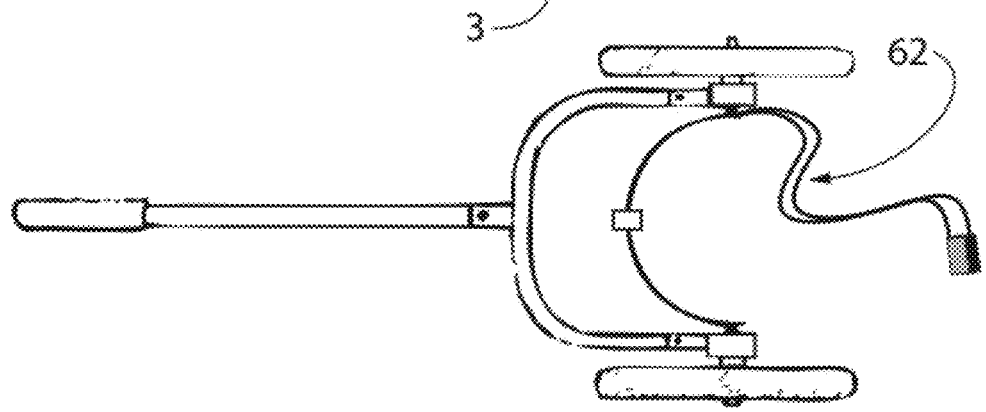

Without being limiting, FIGS. 31 and 32 present the 15 gallon versions for the dolly apparatus, and FIGS. 33 and 34 are the 5 gallon or the 15 gallon versions. These types or sizes of containers are not intended to be limiting but rather listed as examples only. The invention allows for many different variations for this dolly with relatively few components; these components can be part of the dolly kit or accessory kit.

To maximize the tilting ability of the pivoting container holder, the mounting of the container holder within the frame and above the frame preferably should allow the tilting of the container/bucket and also allow enough vertical clearance of the bottom of the container/bucket from the ground (so as to allow easy movement of the apparatus across the ground surface).

Wheels, Skis, Tracks or Other Rolling or Sliding Transportation Parts.

Wheels, skis with springs (or other suspension components, such as struts or shocks), tracks or other rolling or sliding transportation parts are connected to the lower end of the vertical support. As mentioned above to improve tilting ability of the pivoting or gimbaled container holder, wheels can be placed slightly behind or off center of the notch in the top portion of the vertical support. However, other embodiments may allow for other orientations of the wheels in relation to the notch or slot or mounting point of the container holder to the top of the vertical support.

Alternative Embodiments of the Vertical Support

Figure 24A:
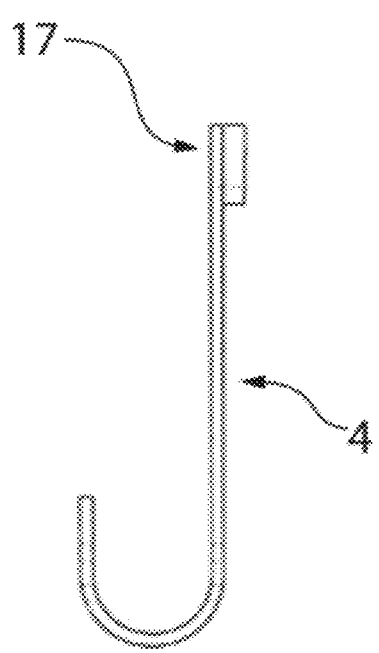
FIG. 24a, 24b show another version of the vertical support with a J-shaped lower or second end.
Figure 24B:
Figure 27:
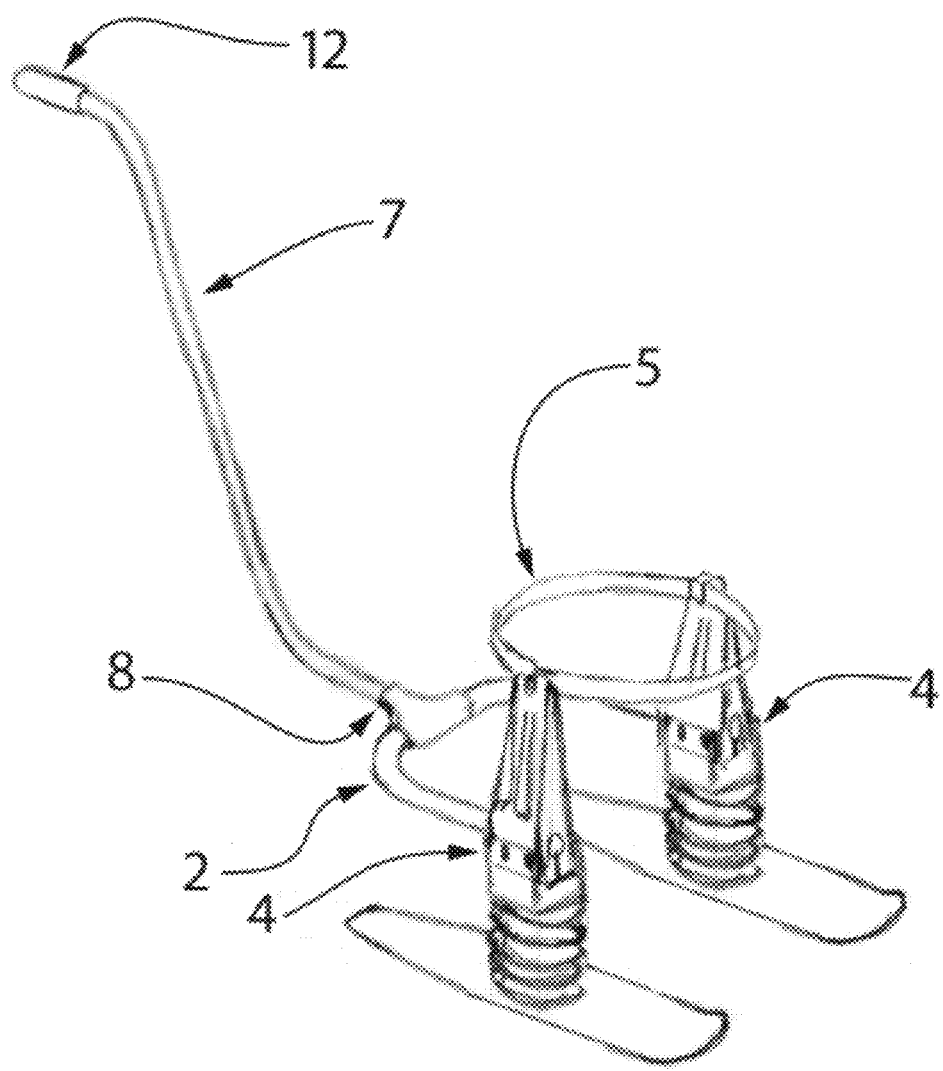
FIG. 27 shows an embodiment of the transport device with skis.

As shown in FIGS. 24 and 26, this invention allows for another version of the vertical support; the vertical support has a first vertical support end and a second vertical support end; the first vertical support end has a slot or notch; the second vertical support end has a flange and a flange opening; the first and the second frame ends are connected to the vertical support through the flange; an axle engages the frame ends and the flange of the vertical support; a wheel is connected to said each axel; the slot of the first vertical support end engages a pivoting container holder; whereby the container is placed within said pivoting container holder. Note that the flange can be an upwardly facing "J-shape". The terminal ends of the C-shaped frame would fit within or engage the "J" area of the lower portion of the vertical support assembly.

Viewing FIG. 26, there is a close up view of this version of the vertical support that shows the similar first or upper end with a notch or slot, but the second or lower end is J-shaped or with a flange structure and the frame end to allow a wheel to be connected to the apparatus. Other suitable means to secure the wheel to the axles can be employed, such as pins, locks, threaded nuts and spring locks, etc.

Viewing FIG. 26, in another possible version of the vertical support, there is a first or top end with a notch/slot for engaging the pivoting male piece for the container holder; there is a second end with at least one hole for engaging a mounting bracket on the frame ends or the frame ends directly. Bolts, screws, pegs or other components can firmly secure the vertical support lower end to the frame ends.

Figure 35C:
FIGS. 35a, 35b and 35c show views of another embodiment of the vertical support.
Figure 35B:
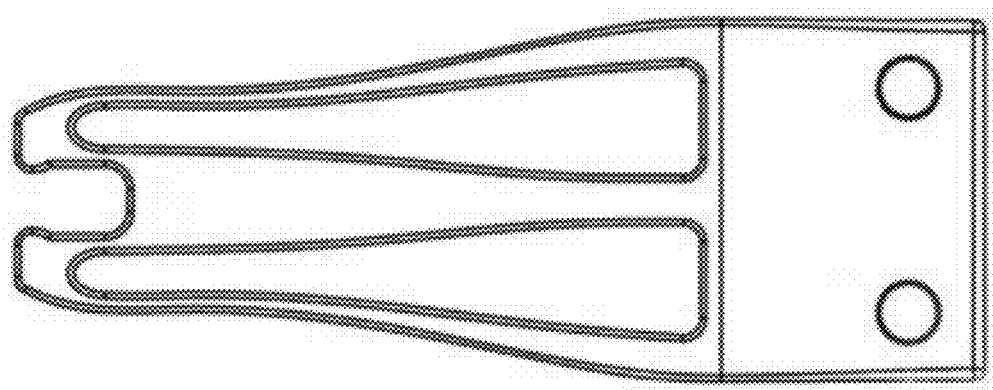
Figure 35A:
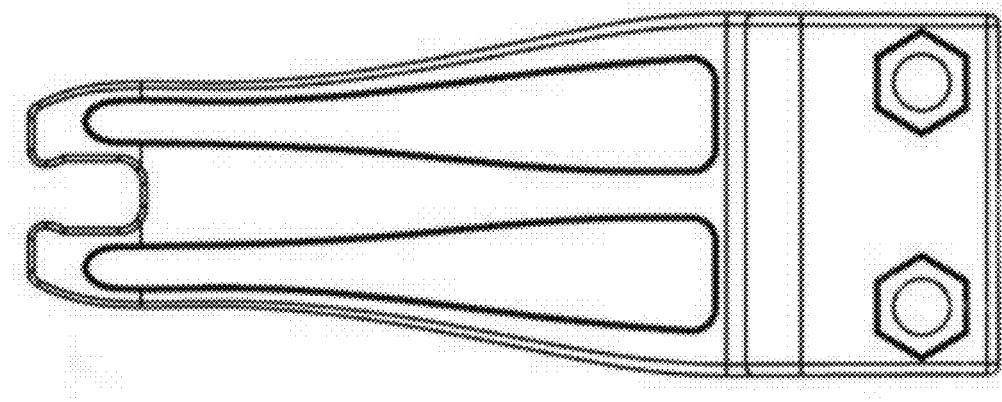

In the embodiment of the vertical support as shown in FIGS. 35a, 35b and 35c, some dimensions are: height (8.625 inches), width at second end (3.213), narrowest width of slot (0.499), widest width of slot (0.600), and depth of slot (1.000); these dimensions are for example only and are not intended to be limiting.

Attachment for Bike Towing:

The first end of the handle body can also be fitted with a coupling attachment to connect to a bike or other type of vehicle for towing. There can also be pivot points and clamps at the connection to the bike and also at the connection between the second end of the handle body and the frame. At the first end of the handle body, there can be a means located at the first end of the handle body for connecting to a vehicle, including without limitation: a clamp, a ball or socket connector, carabineer and a hook.

Figure 29A:
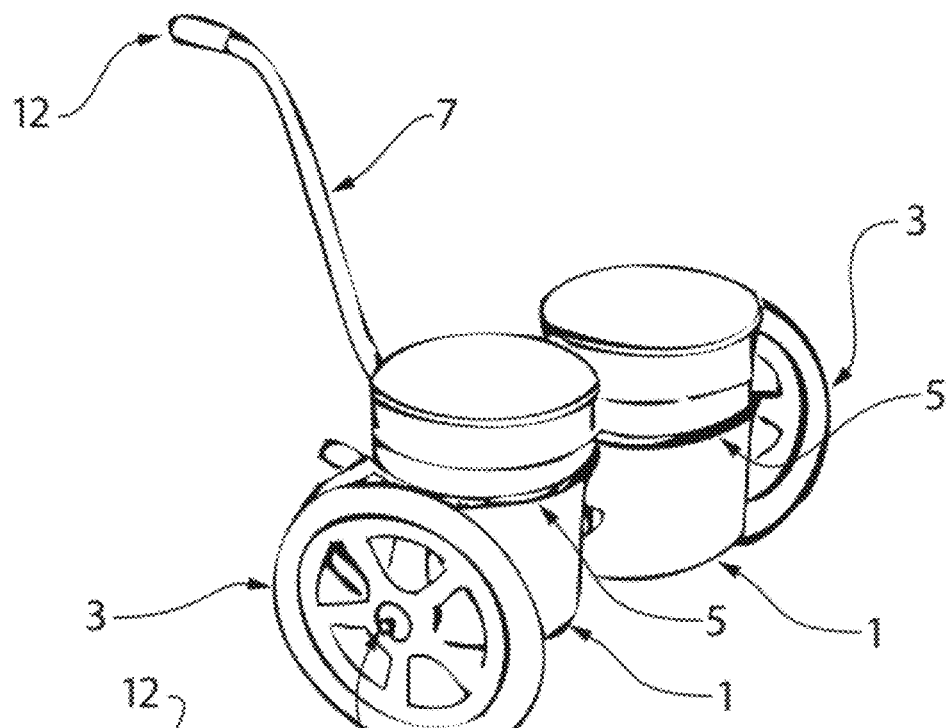
FIGS. 29a, 29b, 30a, 30b and 30c show multiple barrel or container carrier versions.
Figure 29B:
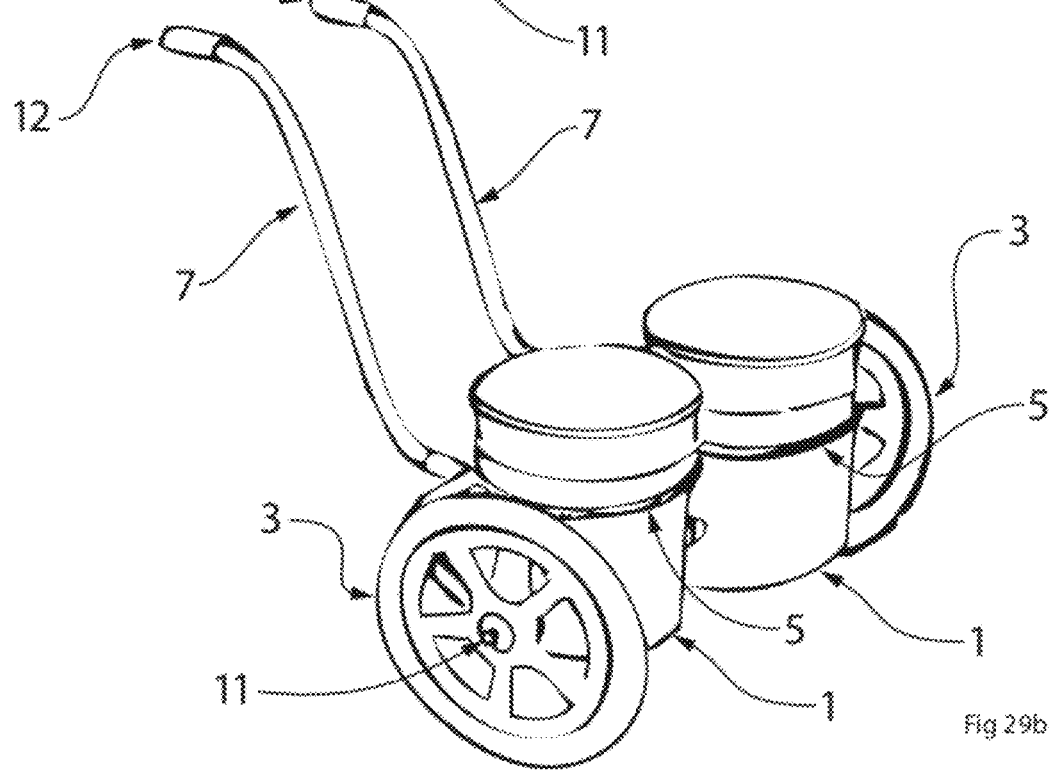
Figure 30A:
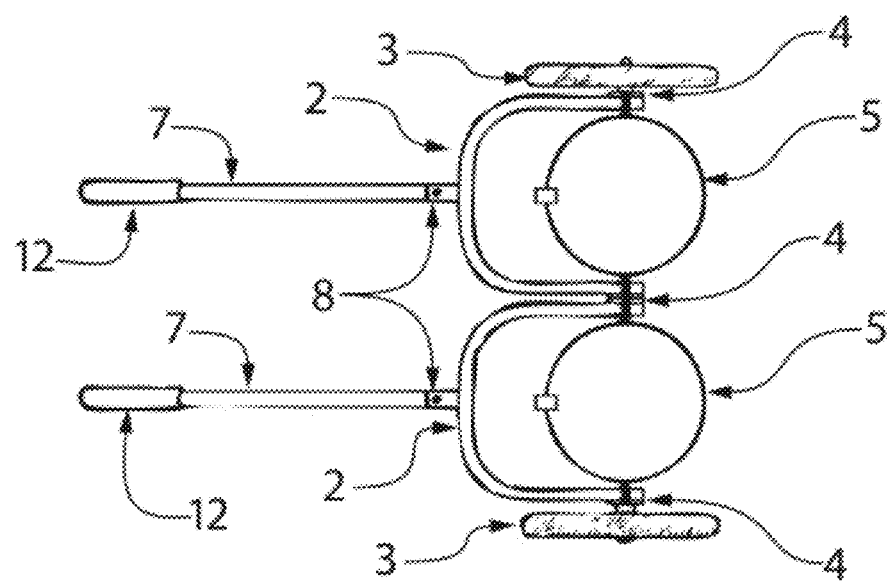
Figure 30B:
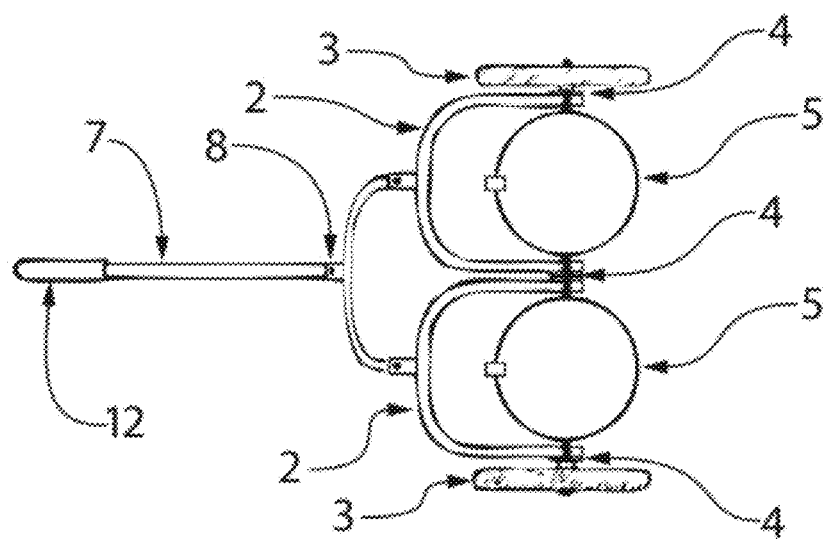
Figure 30C:
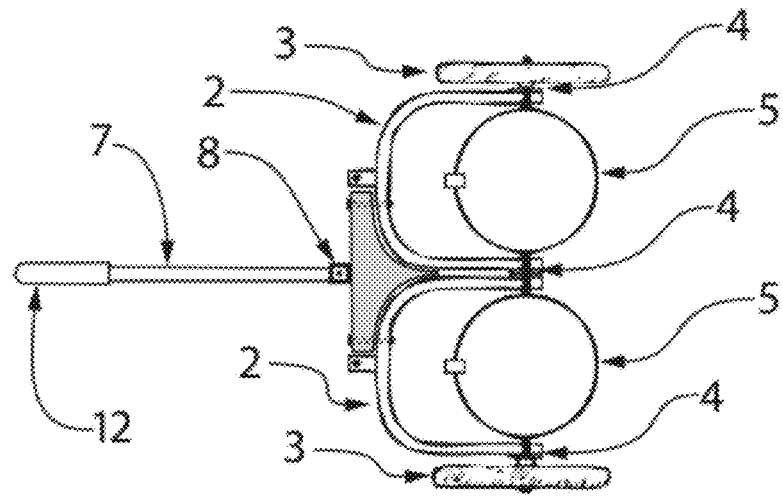

Double and Multiple Container Carriers:

FIG. 29-30 show different variations that combine multiple container carriers together to allow more than one bucket or container to be transported by one user (in a side by side configuration). Further, a third wheel (not shown) could also be integrated between the left and right bucket carriers.

Pivoting Members:

FIG. 31-32 show another possible version of the top portion of the vertical support; this version allows movement up and down but also around the axis of each vertical support. The container supports are separate pieces with a first side (container engagement side) and a second side (having the male piece to engage the top of the vertical support). The male pieces on the second side engage or connect a hole or opening on the top of the vertical support.

This vertical support has a first or inner component and an outer component; there can be an internal spring or hydraulic system that allows movement up and down within this vertical support outer component. In addition, at a different elevation, the container support can be locked so that there is no more rotational movement. At another elevation, the container support can rotate a substantial amount around the axis of the vertical support axis.

Container Strap:

As shown in FIG. 32, a chain or strap can be used once the bucket is "snapped" in or engaged to the container holder to prevent the bucket from being jarred out of the split-ring or container holder.

Figure 21:
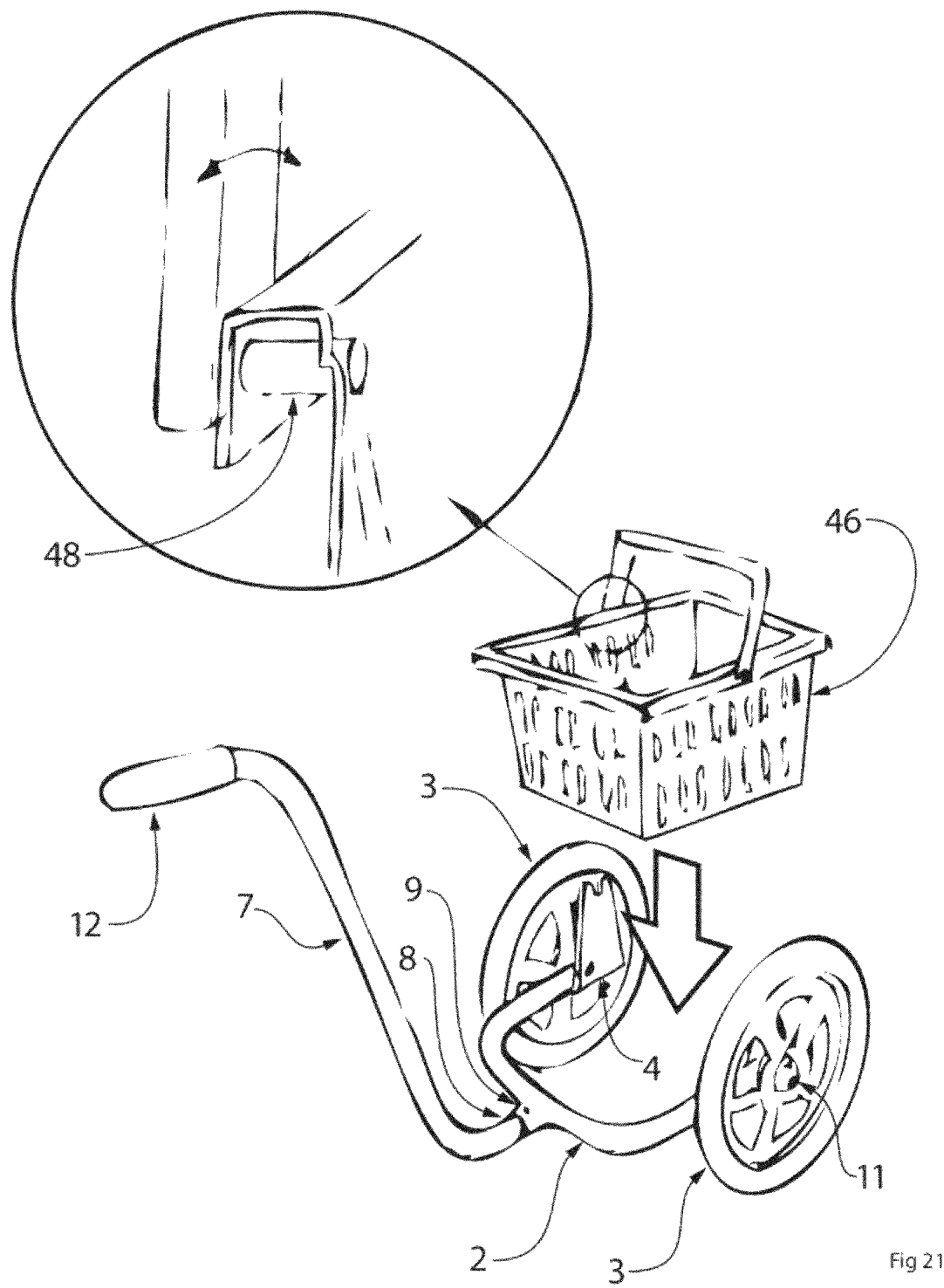
FIG. 21 shows the shopping basket embodiment for the invention.

Shopping Basket Insert:

As seen in FIG. 21, this dolly can be adapted to carry a shopping basket. The boss or male piece in the previous versions of the pivoting or gimbaled container holder can be also integrated into a shopping basket; the male piece or rod that connects the basket handle to the basket body can also be the male piece connector to engage the slot on the top or first end of the vertical support.

Figure 22:
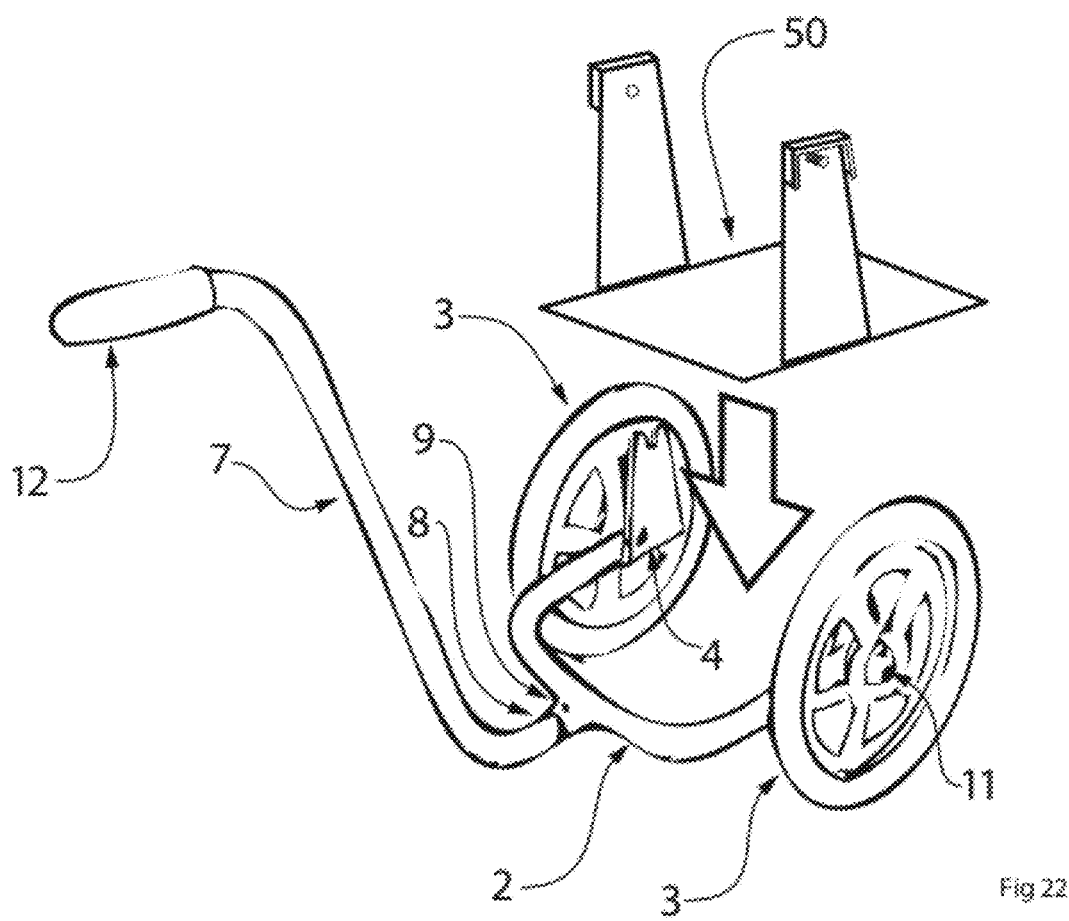
FIG. 22 shows a flat bottom insert to engage the vertical support.

Flat Insert:

As seen in FIG. 22, this dolly can also be adapted to carry any type of insert that has terminal ends with male pieces to engage the slot or notch on the top of the vertical support. This flat insert could also have a adjustable ramp to help guide or slide underneath a heavy container or object.

Figure 23:
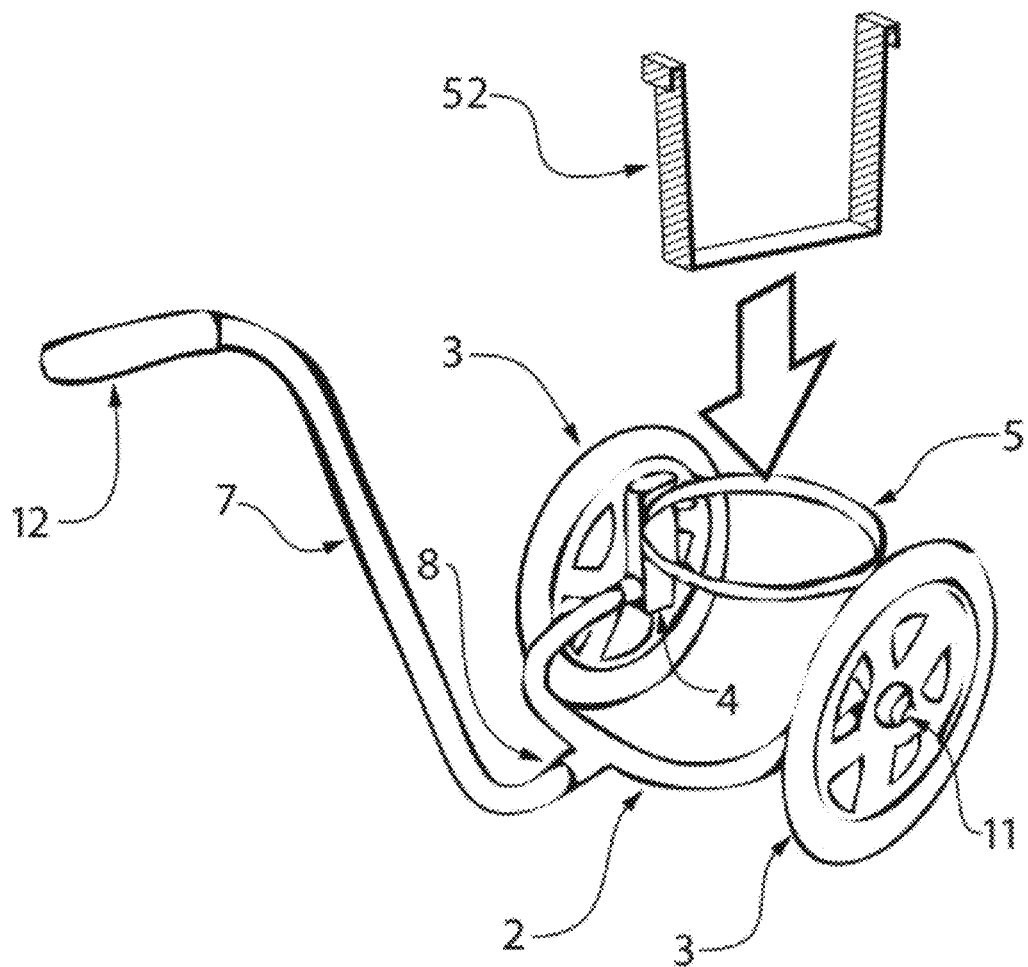
FIG. 23 shows an embodiment of the container holder insert for containers or items that do not have a lip or flange.

Insert for Containers or Objects without a Lip or Flange:

FIG. 23 shows an insert that can be placed into and integrated with the container holder. For containers or objects that do not have a lip, rim or flange that extends over and outside the circumference of the body of the container, such as propane tanks or beer kegs. This type of insert with a body, a central portion, which should be relatively flat or mimic the bottom of the item to be carried, and at least two arms or ends (or multiple arms/ends) with flanges or hooks that grip about the container holder. Further, there can be more than two terminal ends, such as three or four arm configurations. Other configurations of these types of inserts can have three arms or ends that still leave the front or front portion open ended.

Cap for Top Portion of Vertical Support:

A cap or cover can slip over the upper or first end of the vertical support after the user places the male part within the notch/slot. This cap or cover can help retain the male part of the container holder within the slot/notch. Another possible easily closed structure can be a lockable and swinging gate for the top of the vertical support. This gate would have first closed position and at least one second and open position.

According to various embodiments disclosed within this application, an apparatus for transporting a container or load comprises a horizontal "C" or "U" shaped frame cross member and two rigid vertical gimbaled columns instead of a central back bone from which a bucket would be supported. This design allows the bucket to tilt a full 180 degrees on its horizontal axis in order to effortlessly dispense its contents; this design also significantly reduces the work effort required to place the dolly in a travel mode by placing the initial load directly behind the fulcrum point of the axle.

While at rest, the load is already positioned just slightly behind the centerline of the axles requiring only the slightest force to lift the vehicle to its travel mode. In travel mode, the load pivots forward and remains slightly in front of the centerline of the axles, thus requiring no lifting force by the operator to keep it there.

Unlike conventional wheeled dollies, a wheeled dolly or hand truck, according to the embodiments disclosed in this application, may have an open, rigid, horizontal "C" shaped frame structure to which the axles are rigidly attached directly to the vertical columns, which act as the central load-bearing members of the device. The load weight is positioned directly on the wheels through the axles, and the "C" shaped frame simply provides a very rigid connection between the two widespread wheels and allows a place to attach a handle, which bears no load weight but that of the handle and the dolly frame alone.

Another unique part of this design is the use of large, strong connectors at the main contact points and the minimal use of other structural parts, limiting those to the handle, the circumferential ring, and the two connections that connect the "C" shaped frame to the vertical columns.

The minimalistic use of connections also allows for quick and easy disassembly and assembly for ease of transportation or storage, while the oversized connectors, provide the strength and rigidity not seen with similar, latterly wheeled units, specifically those consisting of a singular backbone and one central primary connector serving as the main weight bearing member.

In use, a bucket or a container, including but not limited to a typical 5 gallon plastic bucket, can be placed into the circumferential ring or container holder, and the bucket clasp is attached. The bucket may then be filled with its contents, and the handle is tilted forward where the entire weight of the load is transferred through the gimbaled posts directly into the upright vertical columns and out to the two wheels.

Alternatively, the container holder may employ a latch or latching structure, such that the container holder can be "opened" to wrap around or otherwise encompass a filled container, and then latched or otherwise locked to secure the holder about the exterior circumference of the container.

Preferably during the use of the dolly invention, the weight of the bucket remains on the same axis as the wheels and is not transferred through the handle to the operator. Once the user moves the dolly to the desired location and place, the operator simply lowers the handle until it rests on the ground and tilts the bucket forward to empty its contents.

The disclosed embodiments of the apparatus for moving a container or a load have been devised to offer a significantly easier method of transporting, handling and dispersing the contents of one or more generic 5-gallon plastic buckets or any other type of container. With the commonality of the 5-gallon plastic bucket today, this device will be found practical and useful to anyone who transports material (solid or liquid) using such buckets or similar containers.

This dolly or hand truck may also find use in the transport of tall cylindrical objects, which can fit in the confines of a 5-gallon (or other sized) bucket, such as rolls of roofing paper or in a nursery for hauling small trees.

According to various embodiments, a significant advantage of the dolly or hand truck is that the weight of the container, which is being transported, is supported by the wheels and not the user. As a result, the user need only generally provide sufficient forward force to overcome any resistance of the wheels (or other motive means, including but not limited to tracks or skis) against the ground to enable forward or rearward movement of the apparatus. Unlike conventional dollies, the user need not continuously exert effort to maintain the weight of the bucket or container off the ground. Rather, because the bucket or container does not lean on the frame of the dolly, the wheels (or tracks or skis) generally provide all the necessary support for the bucket or container when the apparatus is in motion.

In other words, the pivoting point of this new dolly or hand truck allows the majority of the weight of the bucket or container to be supported by the wheels. This is very different from a traditional dolly, which requires the user to be part of the "tripod" structure of the traditional dolly and to support a majority of the weight of the item being moved.

This wheel bearing weight aspect is a significant improvement over other dolly devices since it reduces the amount of manual effort needed to transport heavy buckets or containers. Preferably, the wheels of the dolly or hand truck are located slightly behind the notch/slot on the top portion of the vertical support to better enable the functioning of the gimbaled and pivoting container holder. The unique design of the dolly, particularly when employed with oversized wheels, allows the dolly to be easily pushed or pulled over almost any terrain using only one hand; thus, this invention frees the other hand for carrying other utensils (a mop, shovel or other related implements).

This design accommodates any size wheel (large and small) by reducing or increasing the height of the two vertical support members. For example, smaller wheels may require that the vertical supports extend below the C-frame to allow for the bucket to be lifted clear of the ground. The dolly's minimalistic design makes it simple to disassemble and assemble again for storage or transportation without the use of any hand tools.

The dolly or hand truck design also may reduce or eliminate the wear and tear on the user's lower back as the bucket can be placed in the dolly, prior to being filled with material, and its contents simply tilted out from the bucket instead of being manually hoisted and dumped.

The dolly or hand truck may be assembled with a container ring (or container holder), which has two protruding posts, which engage the two corresponding receptors (including but not limited to slots, notches, female parts or sockets) of mechanical supports, which are located on either side of the rigid frame of the dolly.

In one embodiment, the tubular "C" shaped frame, which has forked frame members, is connected to the base of two vertical supports through the use of a circumferential assembly rod, which uses the inside diameter of the round tubular "C" shaped frame as the matching sleeve, and is held rigidly in place by removable fasteners and makes the circumferential ring, the two vertical columns and the "C" shaped frame member into one single assembly.

Attached to the bottom outside section of each vertical column is an axle, which can be rigidly welded or securely attached at 90 degrees to the outside vertical face upon which the oversized wheels are attached through the use of a readily removable fastener on the outermost end of each axle.

Completing the assembly in this example, the tubular handle is inserted into the sleeve that is welded to the centerline of the "C" shaped frame and snugly attached through the use of a readily removable fastener. Disassembly is quick and can take less than a minute, and reassembly would take an equal amount of time and follow the reverse order described above. Other embodiments add a braking system, a suspension system, and/or a motor.

With a proper coupling attachment, a vehicle, bicycle, electric cart and motorcycle can tow this dolly and increase the effective range of the bucket dolly. With the addition of a simple structural connector, two dollies can be mated together to create a two-wheel dolly that can carry two 5-gallon buckets at the same time; this version can have either one centered handle or two handles, which are centered on each C-frame.

Special shopping baskets can be made with interior posts that would rest in the vertical supports, which allow the basket to stay level, while being transported using the dolly. Other inserts fitting into the pivoting container ring would allow the transport of propane tanks, square pails or buckets, or tool pouches. Such inserts comprise an insert body and a first insert body end and a second insert body end; the first and the second insert ends being hook shaped or having grasping flanges or lips.

A dolly plate can be fitted onto the vertical supports allowing for transport of items slid onto the plate as you would with a standard vertical dolly. Another option of the dolly plate may keep the apparatus from pivoting (with respect to the vertical columns).

By increasing the size of the wheels and the width of the C-frame, the design can accommodate a standard 15-gallon nursery container. The pivoting ring would be sized accordingly and have an opening to allow the vehicle to be pushed up to and around the container. The ring would then close around the container to hold it securely. In this design, the pivoting ring posts would be moved to a position forward of the axles of the wheels when the device is at rest. During transport, the handle of the vehicle would be pushed down to lift the container and center its weight over the wheels. By using the leverage advantage of this design, extremely heavy containers can be lifted and transported with minimum physical effort.

There is an apparatus for transporting a container comprising a frame, which has two terminal ends and a center; a handle body, which has a first handle body end and a second handle body end; the first handle body end is connected to a handle; the second handle body end is removably connected to the frame; each terminal end of the frame is connected to a vertical support; the vertical support has a first vertical support end and a second vertical support end; the first vertical support end has a slot or receptor; the second vertical support end comprises: a first hole of the second vertical support end; a second hole of the second vertical support end; a third hole of the second vertical support end; the first and the second holes of the second vertical support end are oriented perpendicularly to the third hole of the second vertical support end; the first and the second holes of the second vertical support end are parallel with respect to one another; the terminal ends of the frame are connected to the vertical support through the third hole of the second vertical support end; an axle engages the second hole of the second end of said each vertical support; a wheel is connected to said each axle; the slot or receptor of the first vertical support end engages a pivoting container holder; whereby the container is placed within said pivoting container holder.

An apparatus for transporting a container comprising: a frame, which has a first frame end and a second frame end and a center; a handle body, which has a first handle body end and a second handle body end; the first handle body end is a handle; the second handle body end is removably connected to the frame; the first and the second frame ends are each connected to a vertical support; each said vertical support has a first vertical support end and a second vertical support end; the first vertical support end has a slot; the second vertical support end comprises: a first hole of the second vertical support end; a second hole of the second vertical support end; the first and the second holes of the second vertical support end are oriented perpendicularly with respect to one another; the first and the second frame ends are connected to the vertical support through the second hole of the second vertical support end; an axle engages the first hole of the second end of said each vertical support; a wheel is connected to said each axle; the slot of the first vertical support end engages a pivoting container holder; whereby the container is placed within said pivoting container holder.

An apparatus for transporting a container comprising: a frame, which has a first frame end and a second frame end and a center; a handle body, which has a first handle body end and a second handle body end; the first handle body end is a handle; the second handle body end is removably connected to the frame; the first frame end and the second frame end are each connected to a vertical support; each said vertical support has a first vertical support end and a second vertical support end; each said first vertical support end has a receptor; each said second vertical support end is connected to an axle and a wheel; the first and the second frame ends are connected to the vertical support; the receptor of the first vertical support end engages a pivoting container holder; whereby the container is placed within said pivoting container holder; said second vertical support end has a flange; the first and the second frame ends are connected to the vertical support through said flange.

The levered handle extension is detachable from the portion of the rigid frame connected to the forked frame members; the levered handle extension is substantially S-shaped, having a first portion substantially parallel with the forked frame members, a second portion substantially perpendicular to said forked frame members, and a third portion terminating in a handle substantially parallel with the forked frame members.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

Any element in a claim that does not explicitly state "means for" performing a specific function, or "step for" performing a specific function, is not be interpreted as a "means" or "step" clause as specified in 35 U.S.C. Sec. 112, Paragraph 6. In particular, the use of "step of" in the claims herein is not intended to invoke the provisions of 35 U.S.C. Sec. 112, Paragraph 6.

We claim:

1. An apparatus for transporting a container comprising:
   a frame, which has a first frame end and a second frame end and a center;
   a handle body, which has a first handle body end and a second handle body end;
   the first handle body end is a handle;
   the second handle body end is removably connected to the frame;
      a first handle body connection part and a second handle body connection part; the first and the second handle body connection parts sandwich the second handle body end and a portion of the frame;
      a threaded collar removably secures the first handle body connection part and the second handle body connection part around the second handle body end and the portion of the frame;
   the first and the second frame ends are each connected to a vertical support;
   each said vertical support has a first vertical support end and a second vertical support end;
   the first vertical support end has a slot;
   the second vertical support end comprises:
      a first hole of the second vertical support end;
      a second hole of the second vertical support end;
         the first and the second holes of the second vertical support end are oriented perpendicularly with respect to one another;
      the first and the second frame ends are connected to the vertical support through the second hole of the second vertical support end;
   an axle engages the first hole of the second end of said each vertical support;
   a wheel is connected to said each axle;
      the slot of the first vertical support end engages a pivoting container holder;
      whereby the container is placed within said pivoting container holder.

2. The apparatus of claim 1 further comprising an insert for the container holder; said insert being able to be cut to a particular shape for said container.

3. The apparatus of claim 1 further comprising a means located at the first end of the handle body for connecting to a vehicle; said means located at the first end of the handle body for connecting to a vehicle is a clamp, a socket and a hook.

4. The apparatus of claim 1, wherein the container holder further comprises a first container holder side and a second container holder side and a first male piece and a second male piece; the first and the second container holder sides sandwich the male pieces; said male pieces pivotally engage the slot on the first ends of the vertical supports.

5. The apparatus of claim 1, wherein the container holder further comprises a first holder part, a second holder part, a third holder part and a first male piece and a second male piece;
   the first, second and third holder parts sandwich the male pieces;
   said male pieces pivotally engage the slot on the first end of the vertical supports.

6. The apparatus of claim 5, wherein the second and third holder parts have outwardly extending holder part ends.

7. The apparatus of claim 1, wherein the container holder further comprises a rotatable clip.

8. The apparatus of claim 1 wherein said container holder is a basket; said basket having at least two basket connection points for engaging the slots on the vertical supports.

* * * * *